United States Patent
Sugiyama

(10) Patent No.: US 9,317,239 B2
(45) Date of Patent: Apr. 19, 2016

(54) IMAGE PROCESSING APPARATUS, SERVER, AND IMAGE PROCESSING SYSTEM

(71) Applicant: Takashi Sugiyama, Okazaki (JP)

(72) Inventor: Takashi Sugiyama, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/851,412

(22) Filed: Mar. 27, 2013

(65) Prior Publication Data

US 2013/0342868 A1  Dec. 26, 2013

(51) Int. Cl.
G06F 3/12 (2006.01)
H04N 1/00 (2006.01)

(52) U.S. Cl.
CPC ............ *G06F 3/1296* (2013.01); *G06F 3/1218* (2013.01); *G06F 3/1239* (2013.01); *G06F 3/1288* (2013.01); *G06F 3/1293* (2013.01); *H04N 1/00244* (2013.01); *H04N 1/00954* (2013.01); *H04N 2201/001* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

2007/0019019 A1* 1/2007 Yoshikawa et al. ............. 347/14
2008/0030750 A1  2/2008 Kato
2008/0204790 A1  8/2008 Kondo
2009/0080022 A1* 3/2009 Tsutsumi .................... 358/1.15
2012/0051764 A1* 3/2012 Kurita ............................ 399/38

FOREIGN PATENT DOCUMENTS

| JP | 2008-40809 A | 2/2008 |
| JP | 2008-210232 A | 9/2008 |
| JP | 2011-076235 A | 4/2011 |

OTHER PUBLICATIONS

Japanese Official Action dated Feb. 16, 2016 received in related application JP 2012-142931 together with an English language translation.

* cited by examiner

*Primary Examiner* — Fan Zhang
(74) *Attorney, Agent, or Firm* — Scully, Scott, Murphy & Presser, P.C.

(57) ABSTRACT

Provided is an image processing apparatus including an image processing device configured to execute an image process, a processor; and memory storing instructions that, when executed by the processor, causing the apparatus to perform determining a reservation request amount which is a processing amount of the image process to be requested to the server, based on execution information of the image process, requesting permission for the processing amount within the reservation request amount determined by the determination unit, to the server, before the image process is executed by the image processing device; and controlling the image processing device to execute the image process within a reservation amount which is the permitted processing amount permitted by the server, after the requesting.

6 Claims, 16 Drawing Sheets

| | PRINTING | | | SCANNING | | | FAX TRANSMISSION | | |
|---|---|---|---|---|---|---|---|---|---|
| USER NAME | NUMBER OF EXECUTION TIMES | TOTAL NUMBER OF EXECUTIONS | UPPER LIMIT | NUMBER OF EXECUTION TIMES | TOTAL NUMBER OF EXECUTIONS | UPPER LIMIT | NUMBER OF EXECUTION TIMES | TOTAL NUMBER OF EXECUTIONS | UPPER LIMIT |
| USER A | 95 | 5 | 150 | 10 | 0 | 150 | 0 | 0 | 150 |
| USER B | 100 | 0 | 150 | 55 | 10 | 100 | 95 | 0 | 200 |
| USER C | 0 | 0 | 100 | 5 | 0 | 100 | 10 | 0 | 100 |
| USER D | 100 | 0 | 100 | 0 | 0 | 0 | 0 | 0 | 100 |

FIG. 6

| EXECUTION INFORMATION OF PRINTING | EXAMPLE OF DETERMINING RESERVATION REQUEST NUMBER C |
|---|---|
| PRINT SPEED | PRINT SPEED (PPM) X CONSTANT VALUE |
| TRANSMISSION SPEED | DATA COMMUNICATION SPEED (PAGE/SECOND) X CONSTANT VALUE |
| COLOR SETTING | MONOCHROME PRINTING : C = 10<br>COLOR PRINTING : C = 5<br>MONOCHROME/COLOR COMBINED PRINTING : C = 10 |
| DOUBLE-SIDED SETTING | SINGLE-SIDED PRINTING : C = 10<br>DOUBLE-SIDED PRINTING : C = 3 |
| IMAGE QUALITY SETTING | STANDARD QUALITY : C = 10<br>HIGH QUALITY : C = 5 |
| REMAINING AMOUNT OF CONSUMABLE MATERIAL | NUMBER OF REMAINING SHEETS IS EQUAL TO OR MORE THAN 21 SHEETS : C = 10<br>NUMBER OF REMAINING SHEETS IS EQUAL TO OR LESS THAN 20 SHEETS : C = 3 |

FIG. 11

| USAGE INFORMATION OF PRINTING | EXAMPLE OF DETERMINING RESERVATION PERMISSION NUMBER C0 |
|---|---|
| REMAINING RESERVATION NUMBER | NUMBER OF REMAINING SHEETS IS EQUAL TO OR MORE THAN 21 SHEETS : $C0 = 10$<br>NUMBER OF REMAINING SHEETS IS EQUAL TO OR LESS THAN 20 SHEETS : $C0 = 3$ |
| NUMBER OF PRINTERS SIMULTANEOUSLY PRINTING | NUMBER OF PRINTERS SIMULTANEOUSLY PRINTING: 1 : $C0 = 20$<br>NUMBER OF PRINTERS SIMULTANEOUSLY PRINTING: 2 : $C0 = 10$<br>NUMBER OF PRINTERS SIMULTANEOUSLY PRINTING: 3 TO 5 : $C0 = 3$<br>NUMBER OF PRINTERS SIMULTANEOUSLY PRINTING: 6 OR MORE : $C0 = 1$ |

IMAGE PROCESSING APPARATUS, SERVER, AND IMAGE PROCESSING SYSTEM

CROSS-REFERENCE TO RELATED APPLICATION

This application claims priority from Japanese Patent Application No. 2012-142931, filed on Jun. 26, 2012, the entire subject matter of which is incorporated herein by reference.

TECHNICAL FIELD

Aspects of the present invention relate to an image processing apparatus, a server, and a process managing method, which perform an image process such as printing or scanning, and more particularly, to a technique for managing a processing amount of an image process in an image processing apparatus.

BACKGROUND

There has been known a management technique for managing a processing amount of an image process such as printing or scanning. According to such management technique, an image processing apparatus itself manages the processing amount of the image process, or a server connected to the image processing apparatus manages the processing amount of the image process.

For example, as one example of the management technique, JP-A-2011-76235 describes a technique in which the following operations are performed between a printer and a server. First, if the printer receives a print instruction, the printer transmits a print request to the server. If the server receives the print request, the server responds with permission information indicating the permission sheet number permitted to print, to a user utilizing the printer. The printer starts printing on a condition that the permission information is acquired, and performs the printing within the permission sheet number. If all print job is not completed within the permission sheet number, the print request is again transmitted to the server to acquire the permission information. If the printing is not allowed, the server responds with the permission information indicating the permission sheet number being zero, to the printer. In this manner, the printing of the printer is managed.

SUMMARY

However, the above-described technique has the following problem. That is, the printer requests the permission sheet number to the server before printing, and the server determines the permission sheet number according to the maximum permission sheet number at the response. However, depending on a usage status of the printer, it may not need the permission sheet number as much. Further, if the number of process times is permitted for one particular printer more than necessary, printing in other printers is limited, which is not desirable.

Accordingly, an aspect of the present invention provides a technique for effectively performing execution management of an image process.

According to an illustrative embodiment of the present invention, there is provided an image processing apparatus comprising: a communication unit configured to communicate with at least a server; an image processing device configured to execute an image process according to image data received via the communication unit; a processor; and memory storing computer readable instructions that, when executed by the processor, causing the image processing apparatus to perform: determining a reservation request amount which is a processing amount of the image process to be requested to the server, based on execution information of the image process; requesting permission for a processing amount within the determined reservation request amount, to the server via the communication unit, before the image process is executed by the image processing device; and controlling the image processing device to execute the image process within a reservation amount which is a processing amount permitted by the server, after the requesting.

According to the above configuration, the reservation request amount is set to a variable value which is determined depending upon the execution information of the image process. Therefore, the processing amount is avoided from being reserved more than necessary, thereby expecting that the execution of the image process is effectively managed.

According to another illustrative embodiment of the present invention, there is provide a server comprising: a communication unit configured to communicate with at least an image processing apparatus; a storage device configured to store an upper limit for a processing amount of an image process for each management object; a processor; memory storing computer readable instructions that, when executed by the processor, causing the server to perform: determining a reservation permission amount which is a processing amount to be permitted each time when a request for permission of a processing amount of the image process is received via the communication unit from the image processing apparatus, based on usage information of the image process; permitting a processing amount such that the processing amount is within the determined reservation permission amount and does not exceed the upper limit, when the request for permission is received from the image processing apparatus; and responding to the image processing apparatus with the permitted processing amount via the communication unit.

According to a further illustrative embodiment of the present invention, there is provide a server comprising: a communication unit configured to communicate with at least an image processing apparatus; a storage device configured to store an upper limit for a processing amount of an image process for each management object; a processor; memory storing computer readable instructions that, when executed by the processor, causing the server to perform: acquiring execution information of the image process from the image processing apparatus via the communication unit; determining a reservation permission amount which is a processing amount to be permitted each time when a request for permission of a processing amount of the image process is received from the image processing apparatus via the communication unit, based on the acquired execution information of the image process; permitting a processing amount such that the processing amount is within the determined reservation permission amount and does not exceed the upper limit, when the request for permission is received from the image processing apparatus; and responding to the image processing apparatus with the permitted processing amount via the communication unit.

According to a further illustrative embodiment, there is provided a process managing method of an image processing apparatus which is configured to communicate with a server, the process managing method comprising: determining a reservation request amount which is a processing amount of a image process to be requested to the server, based on execution information of the image process; requesting permission for a processing amount within the determined reservation request amount to the server, before executing the image process; and executing the image process within a reservation amount which is the processing amount permitted by the server, after the requesting.

According to a further illustrative embodiment of the present invention, there is provided a process managing method of a server which is configured to communicate with an image processing apparatus, the process managing method comprising: determining a reservation permission amount which is a processing amount to be permitted each time when a request for permission of a processing amount of an image process is received from the image processing apparatus, based on usage information of the image process; permitting a processing amount such that the processing amount is within the determined reservation permission amount and does not exceed an upper limit of the processing amount set for each management object using the image processing apparatus, when the request for permission is received from the image processing apparatus; and responding to the image processing apparatus with the permitted processing amount.

According to a further illustrative embodiment, there is provided an image processing system including an image processing apparatus and a server which is configured to communicate with the image processing apparatus. The image processing system comprises: a processor; and memory storing computer-readable instructions, when executed by the processor, causing the image processing system to perform: determining a reservation request amount which is a processing amount of a image process to be requested to the server, based on execution information of the image process; requesting permission for a processing amount within the determined reservation request amount to the server, before executing the image process; and executing the image process within a reservation amount which is the processing amount permitted by the server, after the requesting of permission.

According to a further illustrative embodiment, there is provided an image processing system including an image processing apparatus and a server which is configured to communicate with the image processing apparatus. The image processing system comprises: a processor; and memory storing computer-readable instructions, when executed by the processor, causing the image processing system to perform: determining a reservation permission amount which is a processing amount to be permitted each time when a request for permission of a processing amount of an image process is received from the image processing apparatus, based on usage information of the image process; permitting a processing amount such that the processing amount is within the determined reservation permission amount and does not exceed an upper limit of the processing amount set for each management object using the image processing apparatus, when the request for permission is received from the image processing apparatus; and responding to the image processing apparatus with the permitted processing amount.

According to a further illustrative embodiment of the present invention, there is provided an image processing apparatus comprising: a communication unit configured to communicate with at least a server; an image processing device configured to execute an image process according to image data received via the communication unit; a processor; and memory storing computer readable instructions that, when executed by the processor, causing the image processing apparatus to perform: requesting permission for a processing amount which is a predetermined processing amount of the image process, to the server; judging whether unneccessity information indicating that reservation is not necessary is received from the server after the requesting; and controlling the image processing device to execute the image process without permission of a processing amount from the server in response to the requesting if it is judged in the judging that the unneccessity information is received after the requesting, and controlling the image processing device to execute the image process within a reservation amount which is a processing amount permitted by the server if the processing amount is permitted by the server.

According to a further illustrative embodiment of the present invention, there is provided a server comprising: a communication unit configured to communicate with at least an image processing apparatus; a storage device configured to store an upper limit for a processing amount of an image process for each management object; a processor; memory storing computer readable instructions that, when executed by the processor, causing the server to perform: judging whether permission of a processing amount of the image process is necessary, based on a usage situation of the image process, when a request for permission is received from the image processing apparatus, permitting a processing amount such that the processing amount is within a predetermined processing amount and does not exceed the upper limit if it is judged in the judging that permission is necessary; and responding to the image processing apparatus with the permitted processing amount if it is judged in the judging that permission is necessary, and responding to the image processing apparatus with information indicating that reservation is not necessary without a processing amount if it is judged in the judging that permission is not necessary.

According to the above configuration, the technique for effectively performing execution management of the image process is realized in the image processing system capable of managing the execution of the image process by communication between the image processing apparatus and the server.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 6 is a diagram illustrating an example of determination of a reservation request number and execution information of printing;

FIG. 11 is a diagram illustrating an example of determination of a reservation request number and execution information of printing;

DETAILED DESCRIPTION

Illustrative embodiments of an image processing system and a server will be described in detail with reference to the accompanying drawings. The illustrative embodiments are directed to an image processing system including a multi-function peripheral (MFP) capable of executing image processing operations of printing, scanning, and transmission/reception of FAX, and a server which communicates with the MFP.

[Configuration of Image Processing System]

Figure 1:
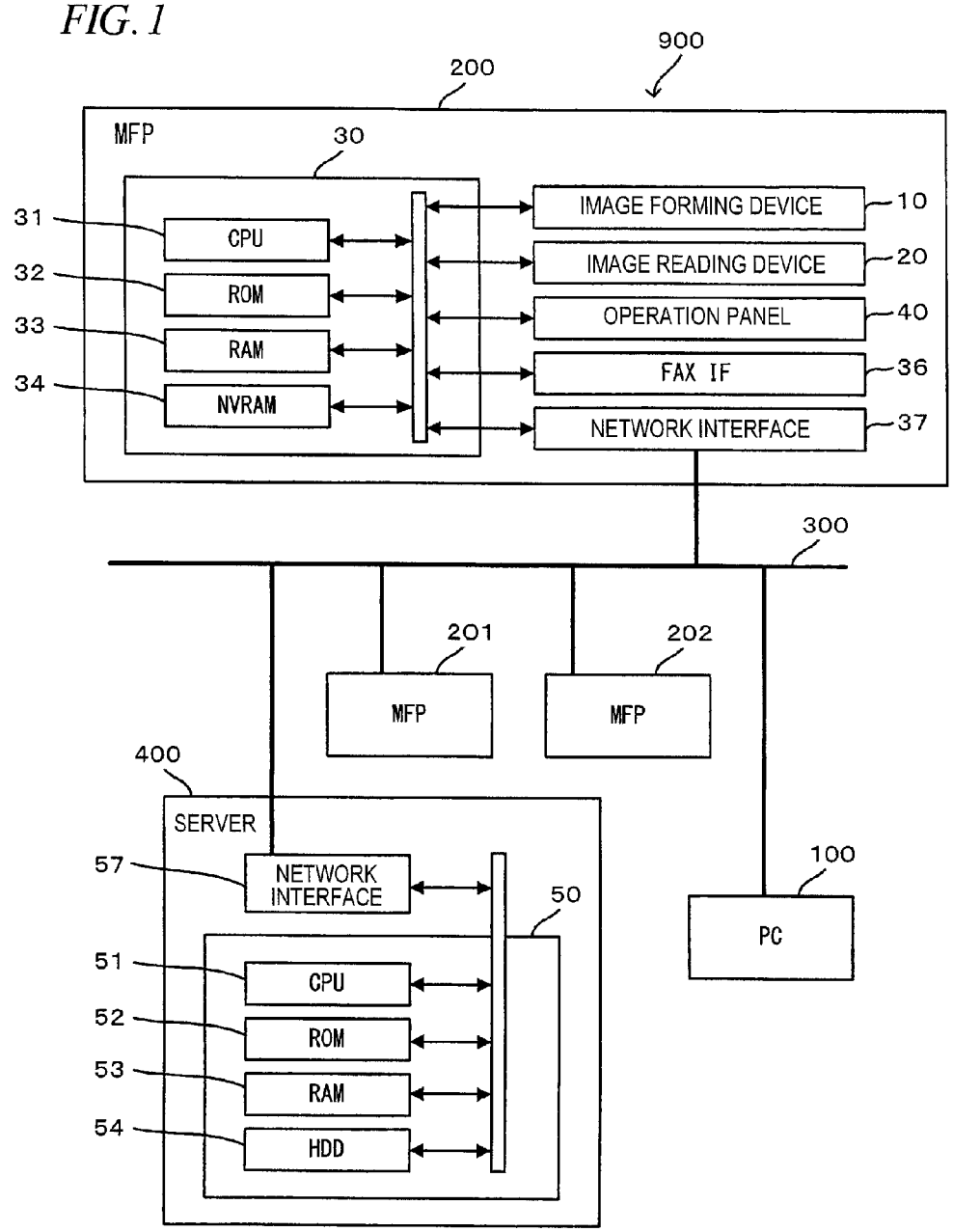
FIG. 1 is a block diagram illustrating an electrical configuration of an MFP and a server according to an illustrative embodiment.

As shown in FIG. 1, an image processing system 900 of this illustrative embodiment includes a PC 100, MFPs 200, 201, and 202, and a server 400. The respective devices can communicate with each other via a network 300. The number of PC and MFP included in the image processing system 900 is not limited thereto. Further, other devices may be included in the image processing system, except for the PC, the MFP, and the server.

[Configuration of MFP]

As shown in FIG. 1, the MFP 200 (an example of an image processing apparatus) of this illustrative embodiment includes a control device 30 having a CPU 31, a ROM 32, a RAM 33, and a non-volatile RAM (NVRAM) 34. The control device 30 is electrically connected to an image forming device 10 (an example of an image processing device) for printing an image on a sheet, an image reading device 20 (an example of an image processing device) for reading an image of a document, an operation panel 40 for displaying a operation status or accepting an input operation by the user, a FAX interface 36, and a network interface 37. Other MFPs 201 and 202 have the same configuration.

The ROM 32 stores firmware which is a control program to control the MFP 200, or various settings, and the initial values. The RAM 33 and NVRAM 34 are used as a working area to which various control programs are read out, or a storage area for temporarily storing data.

The CPU 31 (an example of a determination unit, a request unit, an execution unit, a judgment unit, a subsequent request unit, a change unit, and a necessity judgment unit) stores the processed results in the RAM 33 or the NVRAM 34 in accordance with the control program read from the ROM 32 or a signal sent from various sensors, and controls respective constituent elements of the MFP 200.

The FAX interface 36 is an interface which enables communication with other devices via a public line. The network interface 37 is an interface which enables communication with other devices via Internet. The MFP 200 receives data transmitted from an external device via the FAX interface 36 or the network interface 37. Further, the MFP 200 transmits data to an external device via the FAX interface 36 or the network interface 37.

The operation panel 40 has various buttons for accepting user input, and a touch panel screen which displays character information, buttons or the like. Examples of various types of buttons include an OK button for instructing a start of the image processing operation, or a cancel button for instructing a cancellation of the image processing operation.

[Configuration of Server]

As shown in FIG. 1, the server 400 of this illustrative embodiment includes a control device 50 having a CPU 51, a ROM 52, a RAM 53, and an HDD 54. The control device 50 is electrically connected to a network interface 57. The PC 100 has the substantially same configuration.

The ROM 52 stores a program for various kinds of image processing operations, various settings, and initial values. The RAM 53 and the HDD 54 are used as a working area to which various programs are read out, or a storage area for temporarily storing data.

The CPU 51 (an example of a determination unit, a permission unit, a response unit, a necessity judgment unit, and an acquisition unit) stores the processed results in the RAM 53 or the HDD 54 in accordance with the program read from the ROM 52, and executes various processes.

The network interface 57 is an interface which is connected to the network 300 to enable communication with other devices. The server 400 receives a signal transmitted from another device via the network interface 57, and transmits data to another device via the network interface 57.

Execution Management of Image Process in Image Processing System

First Illustrative Embodiment

Figures 2, 3:
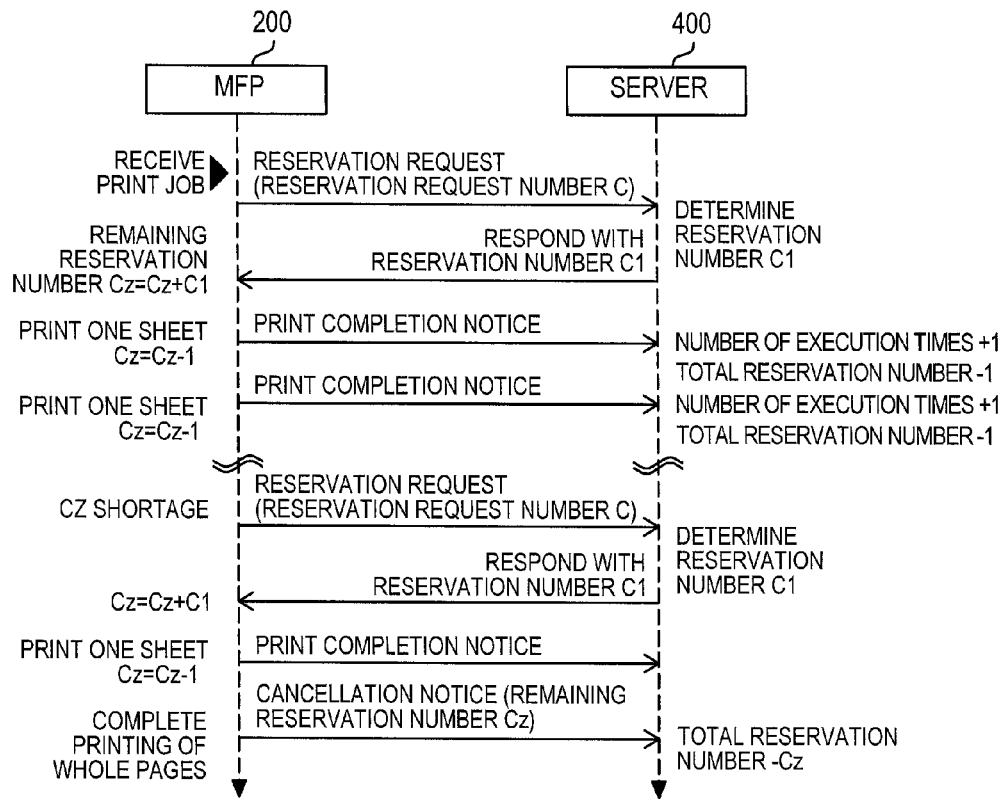
FIG. 2 is a sequence diagram illustrating an operation outline of an execution management in an image processing system according to the illustrative embodiment.
FIG. 3 is a diagram illustrating the configuration of a usage information database of the server.

The execution management of the image processing system 900 will be described with reference to the sequence diagram of FIG. 2. FIG. 2 shows an operation when the MFP 200 receives a print job (that is, an image process is printing).

In the image processing system 900, the server 400 manages the number of execution times in each image process for respective users. Each MFP (MFP 200 in FIG. 2) makes a reservation which is an operation to acquire the permission for the number of execution times of an image process, before the image process is executed. Each MFP starts the execution of the image process on condition that that the permission for the number of execution times is acquired.

For example, when receiving a print job, the MFP 200 transmits a reservation request for requesting a print permission before printing is executed. Since the MFP 200 transmits the reservation request at a stage when the MFP 200 starts receiving the print job, the number of printing times required for the print job is not know. For this reason, the MFP 200 requests the print permission for a constant number of times (hereinafter, referred to as a reservation request number C; e.g., 5 times). In addition, the reservation request includes address information which is information about an address of the MFP 200 of a request source, and user information which is information about a user which is logging on the MFP 200, in addition to the reservation request number C.

When the server 400 receives the reservation request, the sever 400 determines a reservation number C1 which is the number of times which can be permitted to the user, based on the reservation request number C and the user information which are added to the reservation request. As illustrated in FIG. 3, a database (hereinafter, referred to as a usage information DB 541; an example of a storage device) storing a history executed by each user utilizing the image processing system 900 for each image process is stored in the HDD 54, the server 400 determines the reservation number C1 with reference to the usage information DB 541.

Specifically, the usage information DB 541 stores the number of execution times, a total reservation number, and an upper limit, in each image process for respective users. In the image processing system 900 of this illustrative embodiment, the server 400 manages the number of execution times in each image process for respective users, and counts up the number of execution times corresponding to the image process whenever the image process is executed. If the number of execution times in any image process reaches the upper limit, the usage of the image process is prohibited. The server 400 accepts a reservation request from another MFP other than the MFP 200, and a reservation number is added to the total reservation number when the number of execution times is permitted. In other words, the total reservation number is a sum of the number of execution times which is reserved by the reservation request from each MFP.

As illustrated in FIG. 3, the upper limit may be separately set for each user and each image process, or may be commonly set. In addition, the upper limit may be a fixed value, or may be a variable value. Further, the number of execution times, the total reservation number, and the upper limit may be managed by the common database, as shown FIG. 3, or may be managed by separate databases.

When the server 400 receives the reservation request, the server 400 permits the reservation request number C if the sum of the total reservation number, to which the reservation request number C is added, and the number of execution times does not reach the upper limit. If it reaches the upper limit, the server 400 permits the number of times smaller than the reservation request number C. The server 400 responds with the reservation number C1 which is the number of permitted times determined.

The MFP 200 adds the reservation number C1 to the remaining reservation number Cz which is the remainder of the reservation number, and starts printing, on condition that the reservation number C1 is received from the server 400. When one printing is completed, the MFP 200 subtracts 1 from the remaining reservation number Cz, and transmits a print completion notice, which is a signal indicating that the printing has been completed, to the server 400. When receiving the print completion notice, the server 400 adds 1 to the number of print execution times stored in the usage information DB 541, and subtracts 1 from the total reservation number of printing. In addition, the server 400 stores the remaining reservation number Cz for each MFP, and when receiving the print completion notice, 1 may be subtracted from the remaining reservation number Cz stored in the server 400.

In the case where the printing of the whole pages is not completed even through the remaining reservation number Cz becomes smaller than a threshold value, that is, in the case of the shortage of the remaining reservation number, the MFP 200 again transmits a reservation request to the server 400, and then acquires the reservation number C1 from the server 400. Even though the threshold value may be zero, it is preferable that the threshold value be a value larger than zero in order to continuously perform printing.

In the case where the remaining reservation number Cz is equal to or more than 1 after the printing of the whole pages is completed, the MFP 200 transmits a cancellation notice to cancel the reservation to the server 400. The cancellation notice is added by the remaining reservation number Cz. If receiving the cancellation notice, the server 400 subtracts the remaining reservation number Cz added to the cancellation notice from the total reservation number.

On the other hand, in the case where the number of execution times by a user has already reached the upper limit when receiving the reservation request, the server 400 replies with a signal indicating reservation impossibility to the MFP 200. Specifically, the server 400 replies with a signal indicating the reservation number C1 being zero. The MFP 200 received the reservation impossibility notifies the print impossibility to the user, and then cancels a print job. Accordingly, the print is limited. The signal indicating the reservation impossibility is not limited to the signal indicating the reservation number C1 being zero, and may be code which can be determined as the reservation impossibility by the MFP 200.

[Operation of Each Device in Image Processing System]

Next, the operation of the MFP and the server which execute the above-described execution restriction will be described. In the following description, the case where the number of printing times will be described, (that is, an image process is printing). Also, the operation can be applied to other image process such as scanning.

[Print Managing Process of MFP]

Figure 4:
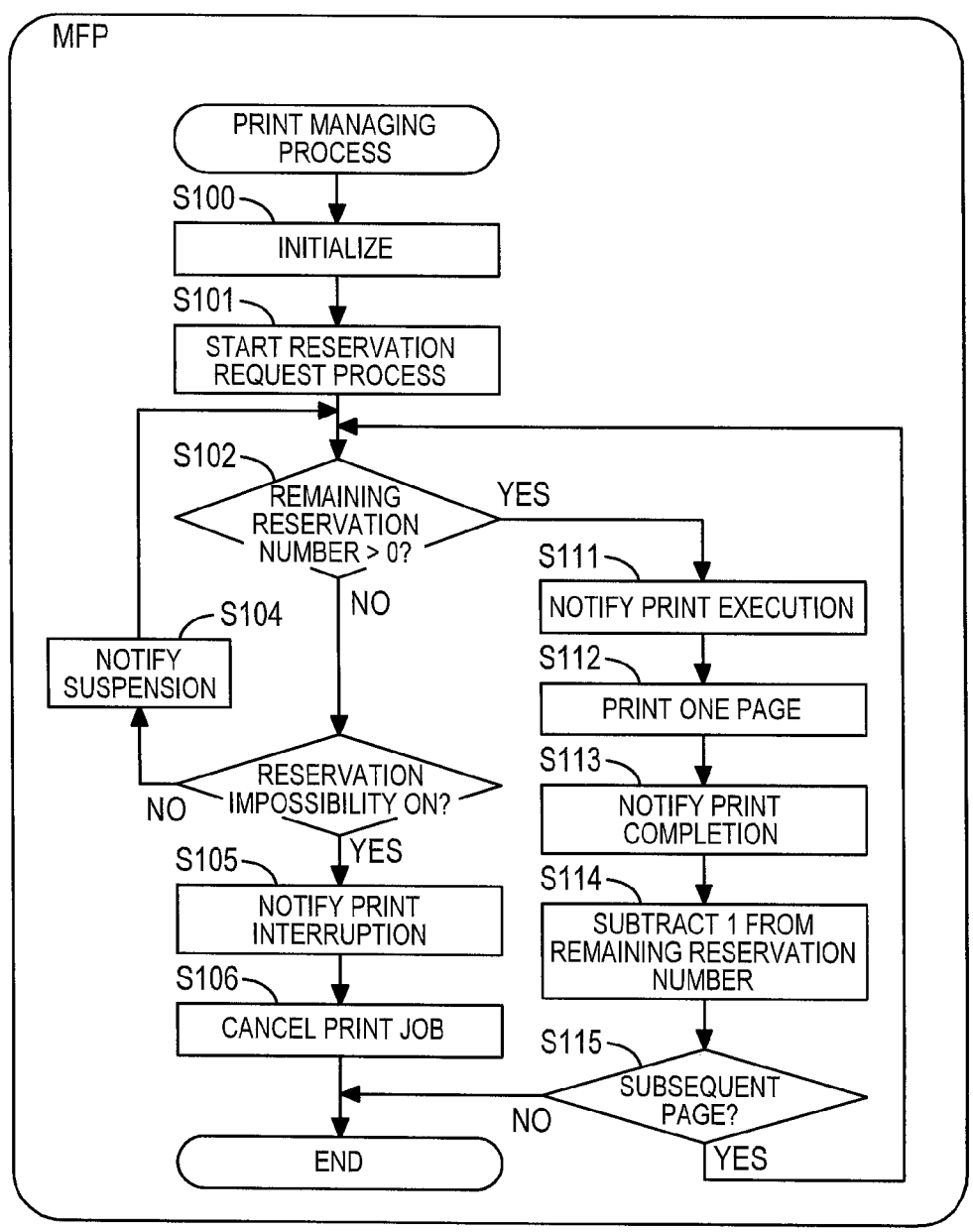
FIG. 4 is a flowchart illustrating an operation sequence of a print managing process of the MFP according to a first illustrative embodiment.

First, the print managing process of managing printing executed by the MFP 200 will be described with reference to the flowchart of FIG. 4. The print managing process is executed by CPU 31 when the MFP 200 receives a print job.

In the print managing process, data shared with a reservation request process which will be described later is initialized (S100). In this example, the data shared with the reservation request process includes the remaining reservation number which is made by subtracting the number of printed times from the reservation number permitted by the server 400, and a reservation impossible flag which is OFF when printing is allowed, and which is ON when printing is not allowed. In S100, the reservation number is made zero, and the reservation impossible flag is made OFF. The data is stored in a memory area which can be shared with the reservation request process and the print managing process.

After S100, the reservation request process of acquiring reservation number from the server 400 starts (S101). As described above, the image processing system 900 should request for the reservation in advance to acquire the reservation number when starting the printing. The reservation request process is a process executed by the CPU 31, like the print managing process, and is executed simultaneously with the print managing process. The detailed reservation request process will be described later.

After S101, it is determined whether the remaining reservation number is more than 0 (S102). An initial value of the remaining reservation number is zero, and whenever the reservation number is acquired from the server 400 by the reservation request process, the reservation number is added.

That is, the remaining reservation number remains zero until the remaining reservation number is acquired from the server 400.

If the remaining reservation number is more than 0 (YES in S102), that is, the reservation number is received from the server 400, a notice indicating printing is notified to a request source of the print job (S111). The image forming device 10 executes printing of one page (S112; an example of an execution unit).

After completing the printing of one page, the print completion is notified to the server 400 (S113). Then, 1 is subtracted from the remaining reservation number (S114). After that, it is determined whether there is a subsequent page (S115). If there is the subsequent page (YES in S115), the process proceeds to S102 to continue the print operation. If there is no subsequent page (NO in S115), the print managing process is completed.

On the other hand, if the remaining reservation number is equal to or less than zero (NO in S102), that is, in the state in which the response is not received from the server 400, it is determined whether the reservation impossible flag is ON (S103). The reservation impossible flag is turned ON if a signal of the reservation impossibility is received from the server 400.

If the reservation impossible flag is OFF (NO in S103), a notice indicating that print is suspended is notified to the request source of the print job (S104). After S104, the process proceeds to S102, and stands by until the reservation number is stored.

On the other hand, if the reservation impossible flag is ON (YES in S103), a printing cancellation is notified to the request source of the print job (S105). The notice of S105 may be added with the information about that the number of print execution times reaches the upper limit. After S105, the print job is cancelled (S106), and the print managing process is completed.

[Reservation Request Process of MFP]

Figure 5:
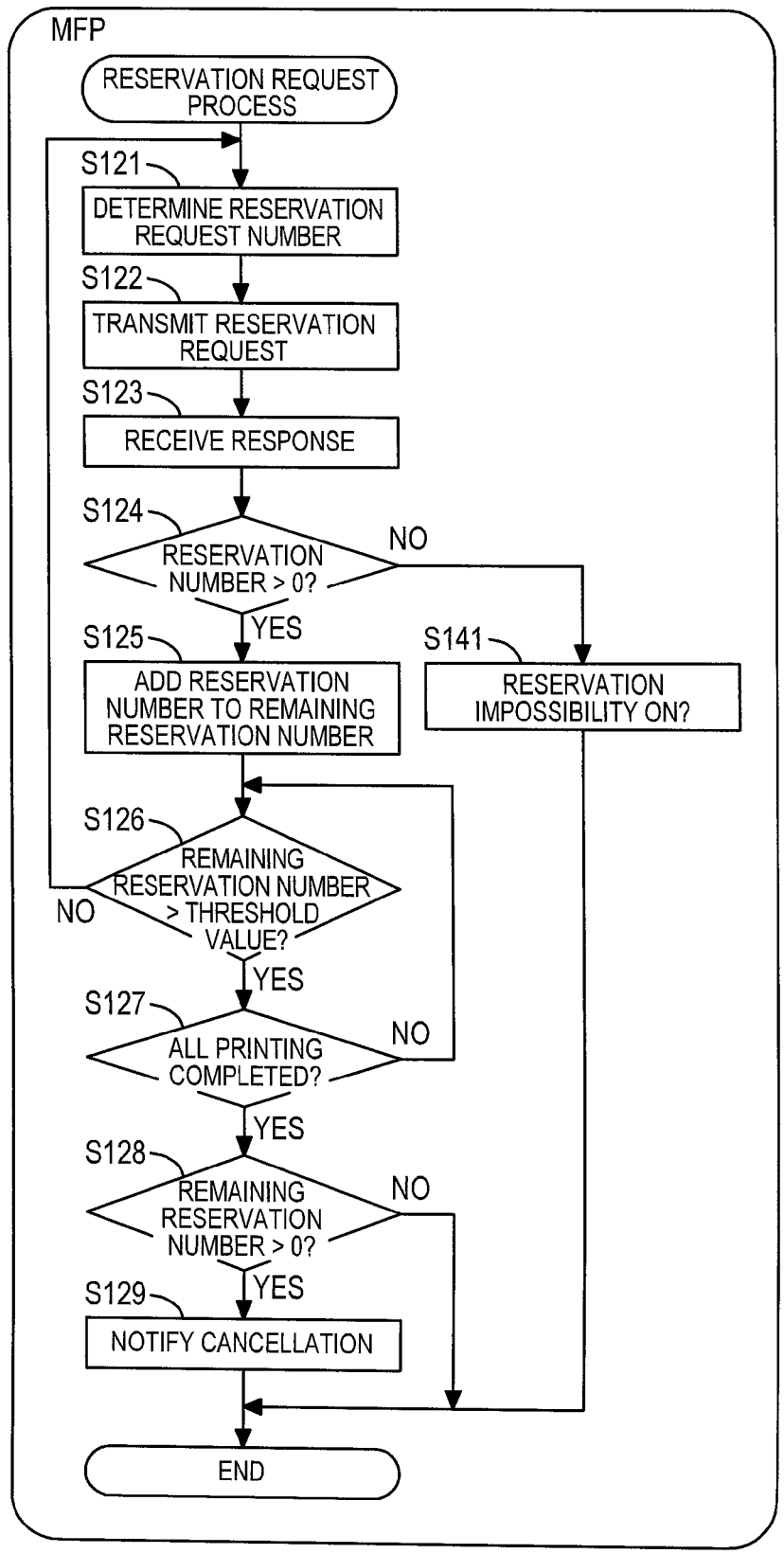
FIG. 5 is a flowchart illustrating an operation sequence of a reservation request process of the MFP according to the first illustrative embodiment.

Next, the reservation request process of acquiring the reservation number from the server 400 by the MFP 200 will be described with reference to the flowchart of FIG. 5. The reservation request process starts at S101 of the above-described print managing process, and is executed by the CPU 31.

In the reservation request process, it is determined whether the reservation request number C which is the number of times to request permission for printing to the server 400 based on print execution information of the MFP 200 (S121; an example of a determination unit). FIG. 6 illustrates an example of the print execution information and determination of the reservation request number C using the print execution information.

For example, assuming that the print execution information is a print speed (the number of printing times per an unit hour), the reservation request number C is determined by Equation 1 below:

$$\text{The number reservation requests } C = \text{print speed (ppm)} \times \text{constant value} \quad <\text{Equation 1}>$$

In the case where a constant value is 0.2, if the print speed is 100 ppm, the reservation request number C is 20 (=100×0.2), and if the print speed is 30 ppm, the reservation request number C is 6 (=30×0.2). When one printing takes time, it has a long time until the remaining reservation number becomes 0 even though the remaining reservation number is small. Therefore, even though the remaining reservation number is small, the time for acquiring the reservation number is enough, and thus it is more likely to maintain the continuity in the printing. The less the reservation number, the more the possibility of securing the desired reservation number in other MFPs. Therefore, as the print speed is slower, the reservation request number C is determined as a smaller value. A minimum reservation request number may be set in advance, and if the reservation request number calculated is less than the minimum reservation request number, the reservation request number C may be set to the minimum reservation request number. Also, instead of Equation 1 described above, a table corresponding to the print speed and the reservation request number C may be prepared.

In addition, for example, assuming that the print execution information is a communication capability of the MFP 200, the reservation request number C can be determined by Equation 2 below:

$$\text{The reservation request number } C = \text{data communication speed (page/second)} \times \text{constant value} \quad <\text{Equation 2}>$$

In the case where a constant value is 10, if the data communication speed is 1 page/second, the reservation request number C is 100 (=1×10), and if the data communication speed is 0.3 page/second, the reservation request number C is 3 (=0.3×10). When the data communication speed is extremely slow, line congestion may occur, and thus it is expected that print completion takes time. For this reason, if the reservation number is large, the printing in other devices is limited as much as that. Therefore, as the data communication speed is slower, the reservation request number C is determined to be a smaller value. Similarly to the print speed, a minimum reservation request number may be set in advance, and if the reservation request number calculated is less than the minimum reservation request number, the reservation request number C may be set to the minimum reservation request number. Also, instead of Equation 2 described above, a table corresponding to the data communication speed and the reservation request number C may be prepared.

In addition, for example, assuming that the print execution information is the setting of the print job, the reservation request number C is determined by whether it is the setting that the image process takes time. The setting that the image process takes time corresponds to, for example, high quality, color, and aggregate print. Also, the reservation request number C may be determined by whether it is the setting that the acquisition for the image data which is an object to be printed takes time. The setting that the acquisition for the image data takes time corresponds to, for example, FAX printing using a telephone line, and copying involving image reading. These settings are more likely to reduce the print speed. Therefore, as much as the setting that the image process takes time or the setting that the acquisition for the image data takes time, the reservation request number C is determined to be the smaller value. In the example of FIG. 6, in the case of the color setting, the reservation request number C is 5, and in the case of a setting other than the color setting, the reservation request number C is 10. In the case of single-sided printing, the reservation request number C is 10, while in the case of double-sided printing, the reservation request number C is 3. In the case of standard image quality, the reservation request number C is 10, while in the case of the setting of high quality higher than the standard image quality, the reservation request number C is 5.

In addition, for example, assuming that the print execution information is a consumable material state of the MFP 200, the reservation request number C is set to a smaller value depending upon the remaining amount of consumable material. The consumable material corresponds to, for example, a sheet or a colorant. In the case where the remaining consumable material is small, the continuity of the printing may be interrupted due to the shortage of the consumable material even if the higher reservation number is acquired. Therefore, as the remainder of the consumable material is smaller, the reservation request number C is determined to a smaller value. In the example of FIG. 6, if the number of remaining sheets which is the number of sheets left in a paper feed cassette is equal to or less than 20 sheets, the reservation request number C is 3. Otherwise, the reservation request number C is 10.

In S121, any one of the above-described conditions may be applied or may be combined. In the case of the combination thereof, any one of the minimum value, the maximum value, and the intermediate value, which are obtained from each condition, can be taken. If the minimum value is taken, since the reservation number for the server 400 is decreased, there is large room that other devices can make a reservation, but the performance of the device itself is more likely to decrease. If the maximum value is taken, since the reservation number for server 400 is increased, the performance of the device itself is less likely to decrease, but there is small room that other devices can make a reservation.

After the reservation request number C is determined in S121, the reservation request is transmitted to the server 400 (S122; an example of a request unit). The reservation request number C determined in S121 is added in the reservation request of S122, and then the execution permission for the printing corresponding to the reservation request number C is requested to the server 400. After S122, the MFP stands by until the response is received from the server 400.

If the server 400 makes response, the MFP receives the response (S123). The response from the server 400 is added with the reservation number which is the number of print execution times permitted by the server 400.

After that, it is determined whether the reservation number acquired from the server 400 is more than 0 (S124). If the reservation number is equal to or less than 0 (NO in S124), that is, the server 400 responds with the reservation impossibility, the reservation impossible flag is turned ON (S141). After S141, the reservation request process is completed. If the reservation request process is ON, in the determination of the print managing process of S103, the process proceeds to S105. Then, the print job is cancelled, the print managing process is completed.

On the other hand, if the reservation number is more than 0 (YES in S124), the remaining reservation number shared with the print managing process is added with the reservation number acquired from the server 400 (S125). Once the remaining reservation number is added with the reservation number, in the determination at S102 of the print managing process, the process proceeds to S111 and printing is started. Once printing is completed, the remaining reservation number is subtracted in S114 of the print managing process. That is, the remaining reservation number is changed by the reservation request process and the print managing process.

After S125, it is determined whether the remaining reservation number is more than a threshold value (S126; an example of a judgment unit). The threshold value of S126 is a threshold value for deciding a next timing of performing the reservation request to perform the printing continuously without waiting for the acquisition of the reservation number which occurs after the printing starts. If the remaining reservation number is equal to or less than the threshold value (NO in S126), it is determined that it is the timing of again performing the reservation request, and then the process proceeds to S121 to request the reservation (an example of a subsequent request unit).

If the remaining reservation number is more than the threshold value (YES in S126), it is determined whether all printing of the print job received is completed (S127). If all the printing is not completed (NO in S127), the process proceeds to S126 to wait for the next transmission timing of the reservation request or the print completion.

If all printing is completed (Yes in S127), it is determined whether the remaining reservation number is more than 0 (S128). If the remaining reservation number is more than 0, that is, the printing of the whole pages is completed without entirely consuming the reservation number acquired (YES in S128), cancellation of the reservation number is notified to the server 400 to cancel the reservation number reserved in the server 400 (S129). The cancellation notice in S129 is added with the remaining reservation number. After S129, or if the remaining reservation number is equal to or less than 0 (NO in S128), the reservation request process is completed.

[Reservation Response Process of Server]

Figure 7:
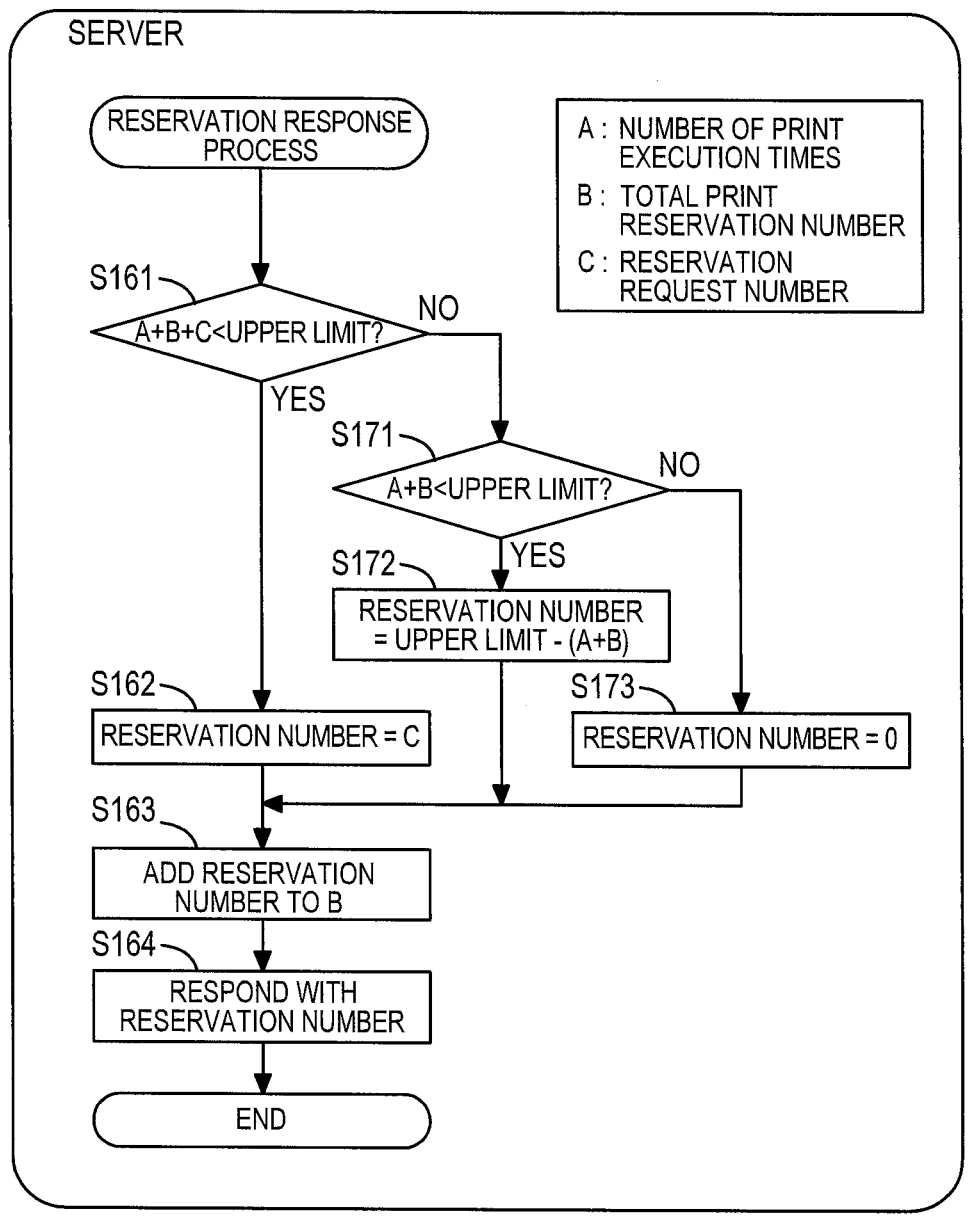
FIG. 7 is a flowchart illustrating an operation sequence of a reservation response process of the server according to the first illustrative embodiment.

Next, the reservation response process of responding the remaining reservation number to permit printing, which is executed by the server 400 will be described with reference to the flowchart of FIG. 7. The reservation response process is executed by the CPU 51 when the server 400 receives the reservation request transmitted in S122 of the reservation request process.

In the reservation response process, it is determined whether the sum D1 (=A+B+C) of the number of execution times A, the total reservation number B, and reservation request number C added to the reservation request received is less than the upper limit (S161). If the sum D1 is less than the upper limit (YES in S161), the number of execution times does not exceed the upper limit even though the permission for the printing corresponding to the reservation request number C is issued. For this reason, it is determined that the reservation number is equal to the reservation request number (S162).

If the sum D1 is equal to or more than the upper limit (NO in S161), the number of print execution times may exceed the upper limit if the permission for the printing by the reservation request number C is issued. Thus, it is determined whether the sum D2 (=A+B) of the number of print execution times A and the total reservation number B is less than the upper limit (S171). If the sum D2 is less than the upper limit (YES in S171), the number of print execution times does not exceed the upper limit, and the reservation number is determined as a value which is made by subtracting the sum D2 from the upper limit (S172). On the other hand, if the sum D2 is equal to or more than the upper limit (NO in S171), there is no room to issue new print permission. For this reason, the reservation number is set to 0 (S173).

After the reservation number is determined in S162, S172 or S173, the reservation number determined is added to the total reservation number B (S163). And, the reservation number determined is transmitted to a request source of the reservation request (S164). After S164, the reservation response process is completed.

[Print Counting Process of Server]

Figure 8:
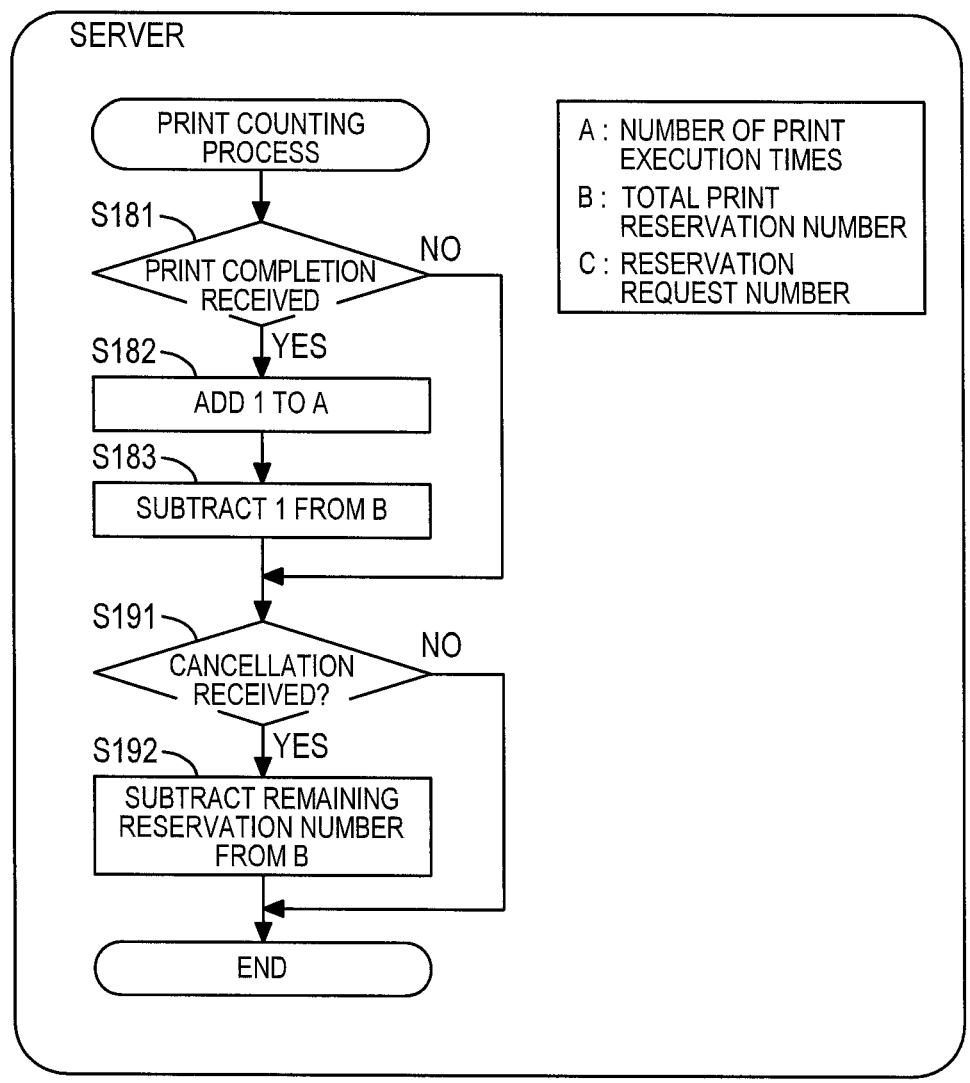
FIG. 8 is a flowchart illustrating an operation sequence of a print counting process of the server according to the first illustrative embodiment.

Next, the print counting process of changing the number of print execution times and the total reservation number by the server 400 will be described with reference to the flowchart of FIG. 8. The print counting process is executed at a constant frequency (e.g., at interval of one second) by the CPU 51 after the server 400 starts.

In the print counting process, it is determined whether the print completion notice is received (S181). Whenever the printing is completed in the MFP 200, the print completion notice is transmitted (e.g., S113 of the print managing process in FIG. 4). If the print completion notice is received (YES in S181), 1 is added to the number of print execution times (S182). Furthermore, 1 is subtracted from the total reservation number for the printing (S183).

After S183, or if the print completion notice is not received (NO in S181), it is determined whether the cancellation notice is received (S191). The cancellation notice is transmitted in the case where the reservation number cannot be used in the step in which the process of the print jobs is completely finished in the MFP (e.g., S129 of the reservation request process in FIG. 5).

If the cancellation notice is received (YES in S191), the remaining reservation number added to the cancellation notice is subtracted from the total reservation number for the printing (S192). After S192, or if the cancellation notice is not received (NO in S191), the print counting process is completed.

As described above, in the image processing system of the first illustrative embodiment, the reservation request number C requested to the server by the MFP 200 is determined based on the execution information about the image process. For this reason, the MFP 200 is prevented from securing the reservation number more than necessary, so that it can be expected that the number of image processing times is effectively managed.

Second Illustrative Embodiment

Next, an execution management of the image process according to a second illustrative embodiment will be described. In the second illustrative embodiment, the server 400 determines the reservation number based on the usage information about the image process. This is different from the first illustrative embodiment, in which the MFP 200 determines reservation request number C based on the execution information about the image process, and the server 400 determines the reservation number based on the reservation request number C. In the second illustrative embodiment, the print managing process of the MFP 200 and the print counting process of the server 400 are similar to those of the first illustrative embodiment, and thus are not described herein. The same processes as those of the first illustrative embodiment are denoted by the same reference numerals, and its description will be simplified.

[Reservation Request Process of MFP]

Figure 9:
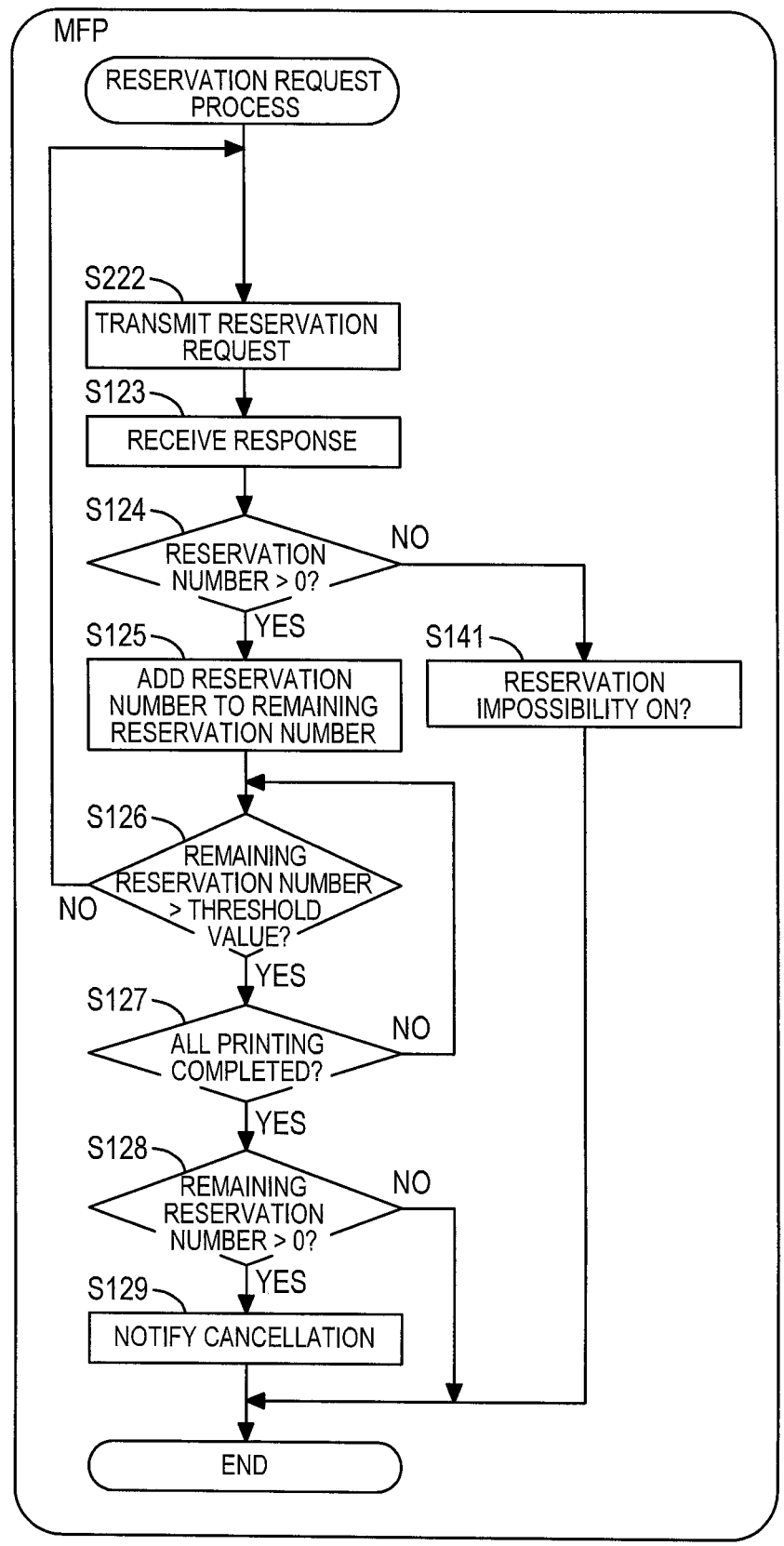
FIG. 9 is a flowchart illustrating an operation sequence of a reservation request process of the MFP according to a second illustrative embodiment.

First, the reservation request process executed by the MFP 200 will be described with reference to the flowchart of FIG. 9. In the reservation request process of the second illustrative embodiment, after starting, the reservation request is immediately transmitted to the server 400 (S222). The second illustrative embodiment is different from the first illustrative embodiment in that the reservation number C1 is not added to the reservation request. That is, in the second illustrative embodiment, the reservation number C1 is not determined. After S222, the MFP receives the response from the server 400 (S123). The processes after S123 are similar to those of the first illustrative embodiment.

[Reservation Response Process of Server]

Figure 10:
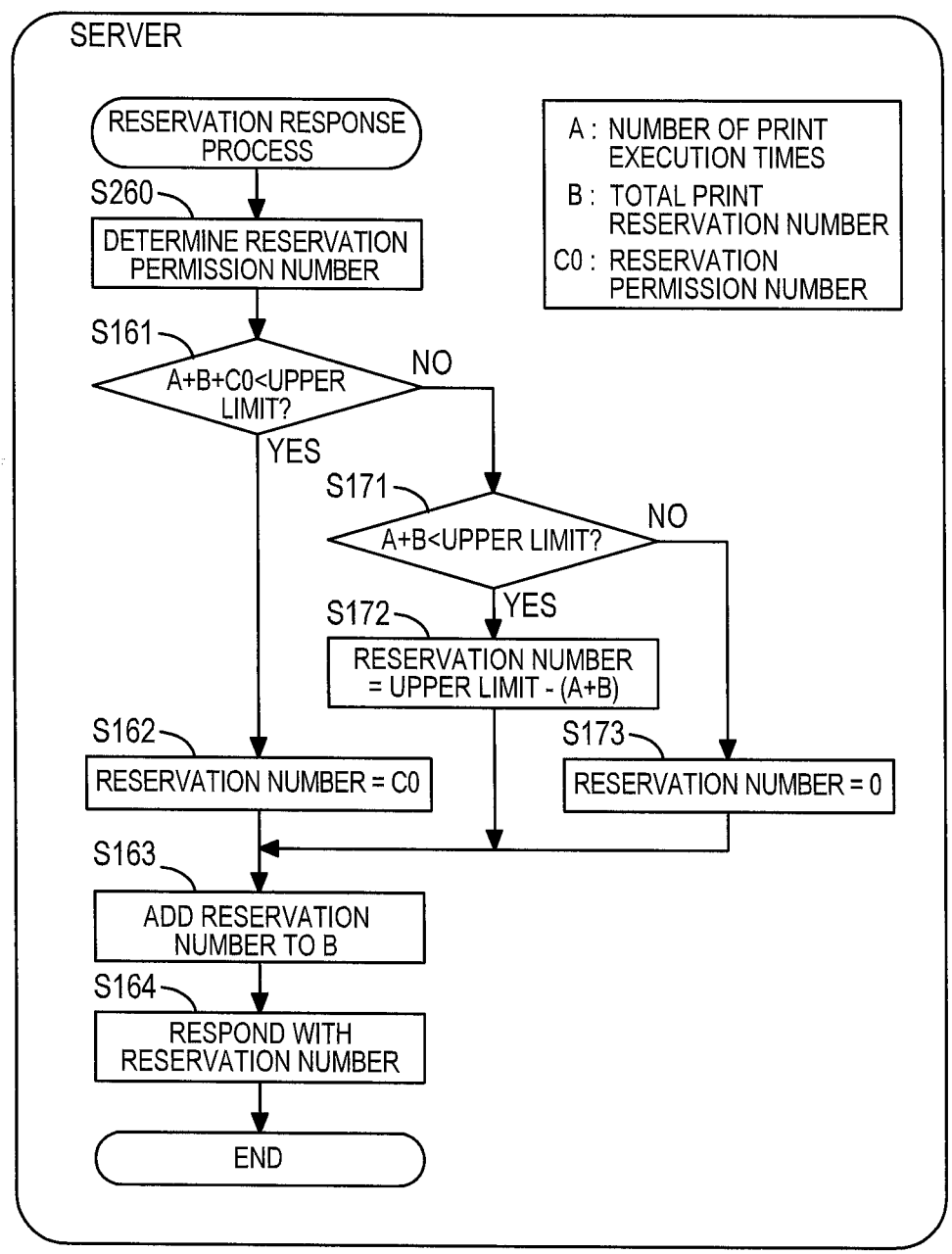
FIG. 10 is a flowchart illustrating an operation sequence of a reservation response process of the server according to the second illustrative embodiment.

Then, the reservation request process executed by the server 400 will be described with reference to the flowchart of FIG. 10. In the reservation request process of the second illustrative embodiment, first, the reservation permission number C0 which is the number of times to permit the printing for one reservation request is determined based on the printing usage information of the server 400 (S260; an example of a determination unit). In the second illustrative embodiment, since the transmission source of the reservation request does not add the reservation request number C to the reservation request, the server 400 determines the reservation permission number C0. FIG. 11 illustrates an example of the usage information of printing, and determination of the reservation permission number C0 using the usage information, in S260.

For example, the remaining available reservation number (=the upper limit−(the number of execution times+the total reservation number) is calculated, and then the reservation permission number C0 is determined depending upon the remaining available reservation number. In the example illustrated in FIG. 11, if the remaining available reservation number is equal to or less than 20 pages, the reservation permission number C0 is 3. Otherwise, the reservation permission number C0 is 10. In the state in which the remaining available reservation number is small, it is unlikely to give the sufficient reservation number to the device requiring the reservation later. Thus, as the remaining available reservation number is smaller, the reservation permission number C0 is determined to be a smaller value.

In addition, for example, assuming that the printing usage information is the number of printers simultaneously operating or the number of printers simultaneously printing (the number of printers simultaneously printing), the reservation permission number C0 is determined depending upon the number of the printers simultaneously printing. In the example of FIG. 11, if the number of the printers simultaneously printing is 1, the reservation permission number C0 is 20, while if the number of the printers simultaneously printing is 2, the reservation permission number C0 is 10. Further, if the number of the printers simultaneously printing 3 to 5, the reservation permission number C0 is 3, while if the number of the printers simultaneously printing is 6 or more, the reservation permission number C0 is 1. In the state in which the devices working at the same time are many, it is preferable to equally give the reservation number to each device. On the other hand, if the reservation number given at one time is many, it is unlikely to give the sufficient reservation number to the device requiring the reservation later. Thus, as the number of printers simultaneously printing is more, the reservation permission number C0 is determined to be a smaller value.

After determining the reservation permission number C0 in S260, it is determined whether the sum D3 (+A+B+C0) of the determined reservation permission number C0, the number of execution times, and the total reservation number B is less than the upper limit (S161). The processes after S161 are similar to those of the first illustrative embodiment. That is, the reservation number is determined based on the execution times A, the total reservation number B, and the reservation permission number C0 (S162, S172, and S173; an example of a permission unit). Also, the determined reservation number is transmitted to the MFP 200 of the request source (S164; an example of a response unit).

As described above, in the image process system of the second illustrative embodiment, the server 400 determines reservation permission number C0 based on the usage information about the image process, and determines the reservation number responding to the MFP 200 of the request source based on the reservation permission number C0. For this reason, according to this illustrative embodiment, it is also possible to prevent that each MFP 200 secures the reservation number more than necessary, so that it is expected that the number of image processing times is effectively managed.

In the second illustrative embodiment, the reservation request number C is not added to the reservation request from the MFP 200, but a predetermined number (fixed value) may be added. In this instance, in S260 of the reservation response process executed by the server 400, it may be determined whether it satisfies a predetermined condition, using the predetermined number added to the reservation request, and the reservation permission number C0 may be determined in accordance with the determined result.

Figure 12:
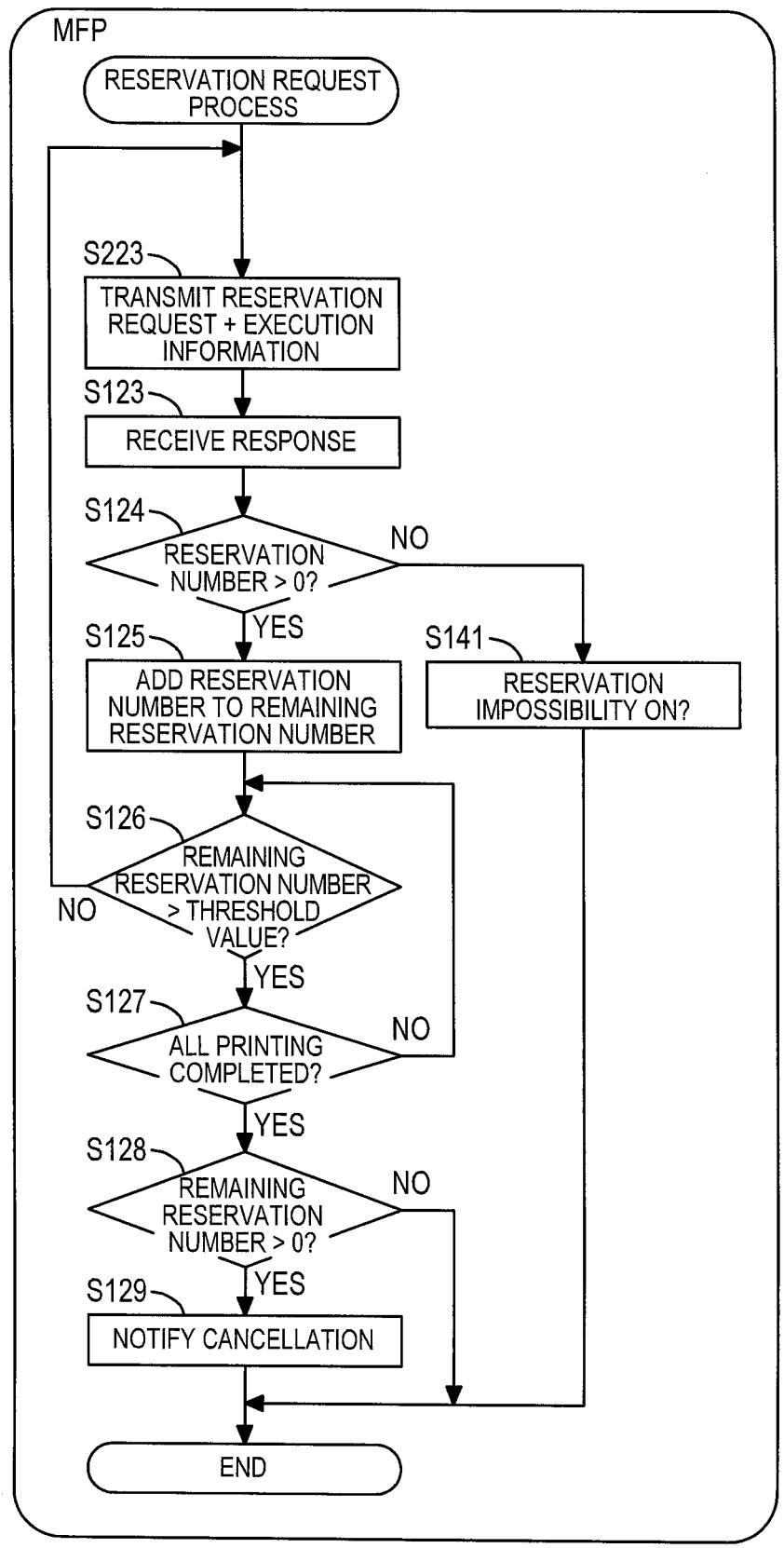
FIG. 12 is a flowchart illustrating an operation sequence of a reservation request process of the MFP according to a modified embodiment of the second illustrative embodiment.

In the second illustrative embodiment, when the server 400 determines the reservation permission number C0 in S260, the determination is made based on the printing usage information of the server 400, but the determination may be made based on the print execution information of the MFP 200, similarly to the first illustrative embodiment. In this instance, as illustrated in FIG. 12, when the MFP 200 transmits the reservation request, the print execution information of the MFP 200 is also transmitted (S223). The print execution information corresponds to the print speed, the communication speed, the job setting, and the remaining amount of consumable material, similar to the first illustrative embodiment.

Figure 13:
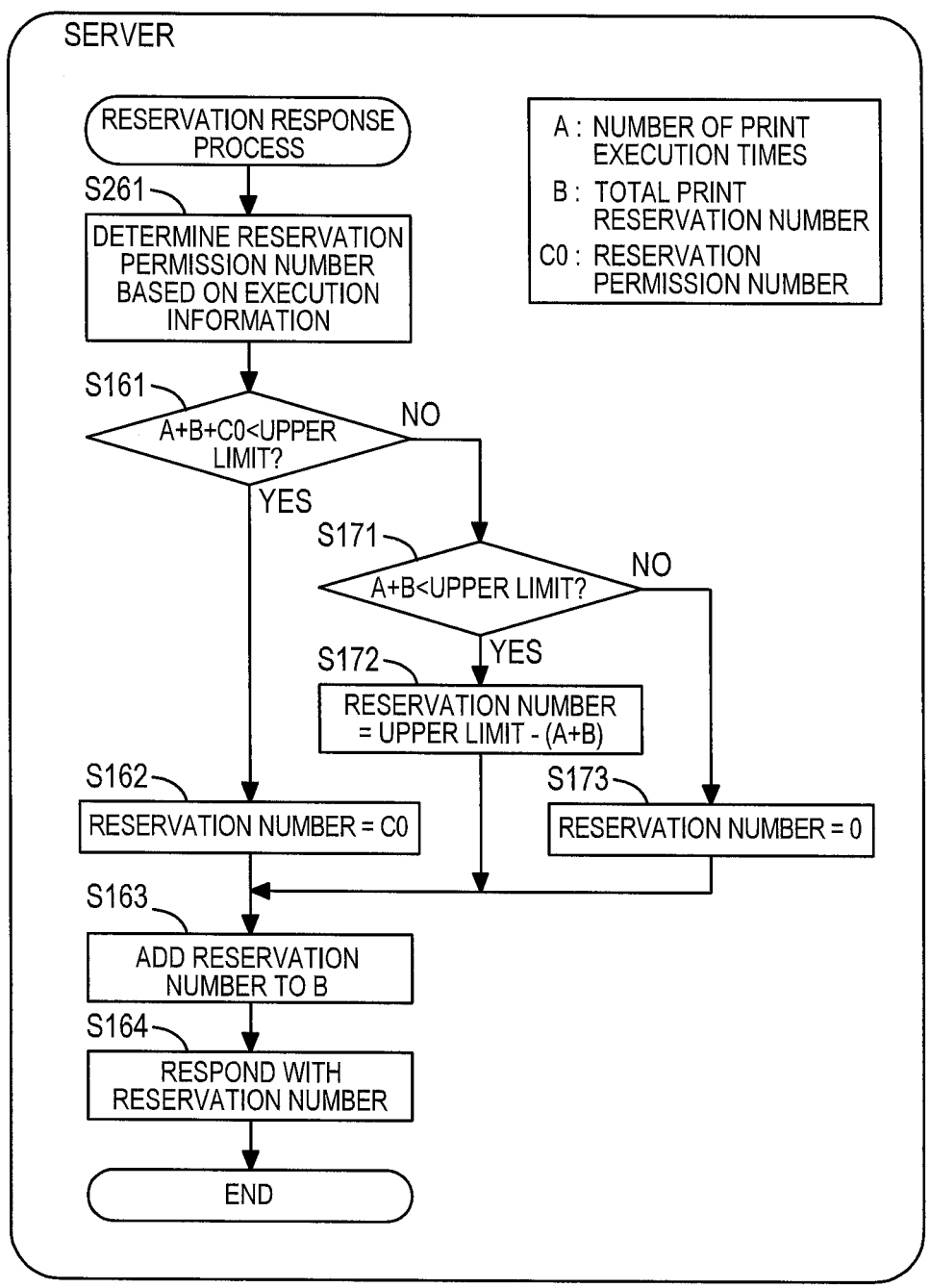
FIG. 13 is a flowchart illustrating an operation sequence of a reservation response process of the server according to the modified embodiment of the second illustrative embodiment.

The server 400 receives the print execution information simultaneously with the reservation request, and acquires the print execution information about the MFP 200 of the request source (an example of an acquisition unit), thereby executing the reservation response process illustrated in FIG. 13. Then, the reservation permission number C0 is determined based on the print execution information received (S261). The method of determining the reservation permission number C0 in S261 is similar to S121 of the first illustrative embodiment. Since the reservation permission number C0 is determined based on the information from the MFP 200, it can be expected that the reservation number suitable for the MFP 200 is determined.

Third Illustrative Embodiment

Next, an execution management of the image process according to a third illustrative embodiment will be described. In the third illustrative embodiment, the printing is reserved in a situation in which the reservation is necessary, while the process of counting the reservation number is not performed in a situation in which the reservation is not necessary. This is different from the first illustrative embodiment, in which the printing is reserved regardless of the situation in which the reservation is necessary or not. The same processes as those of the first illustrative embodiment are denoted by the same reference numerals, and its description will be simplified.

Print Managing Process of MFP

Figure 14:
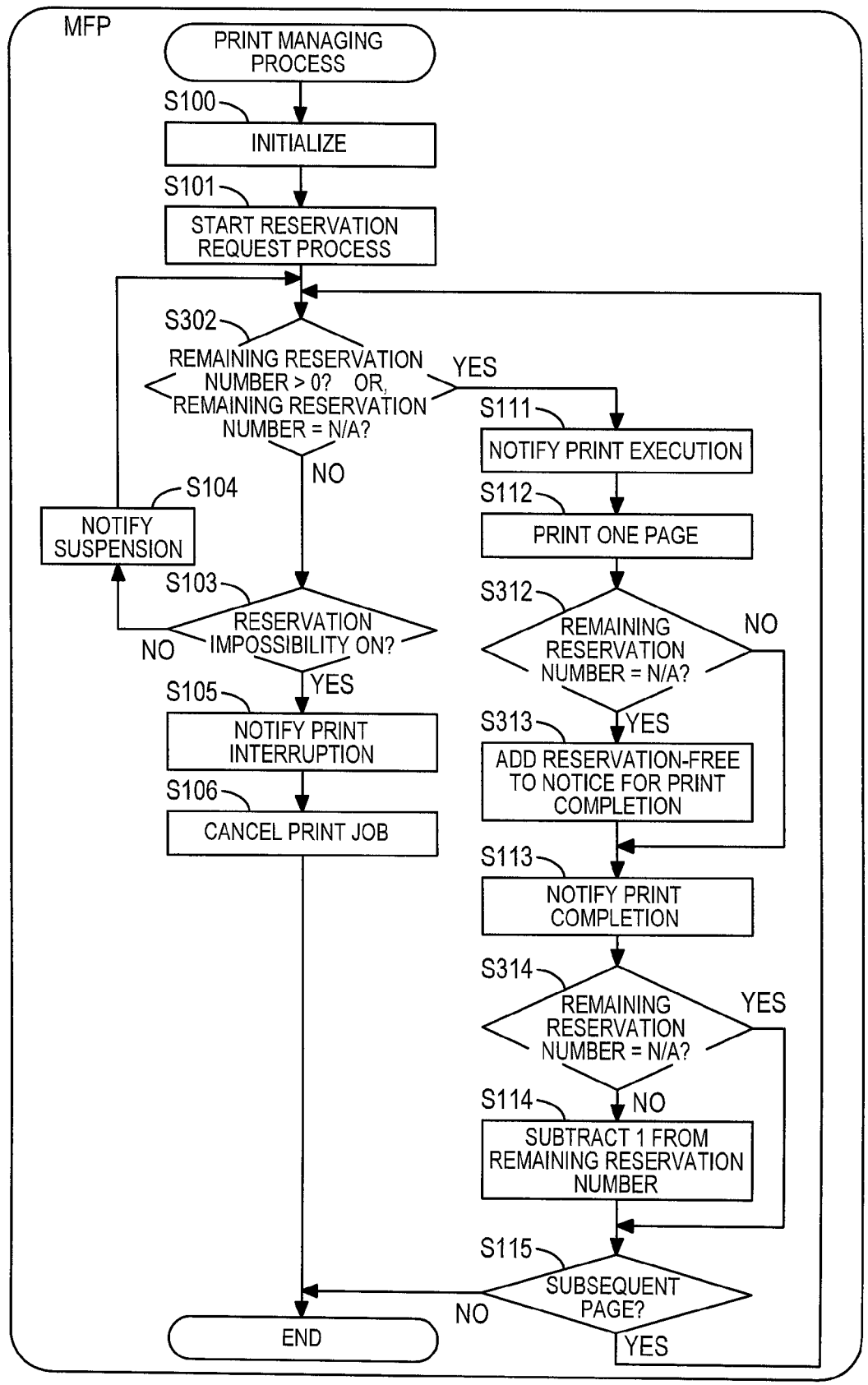
FIG. 14 is a flowchart illustrating an operation sequence of a print managing process of the MFP according to a third illustrative embodiment.

First, the print managing process executed by the MFP 200 will be described with reference to the flowchart of FIG. 14. In the print managing process of the third illustrative embodiment, after the reservation request process starts in S101, it is determined whether the remaining reservation number is more than 0, or a code (N/A in this example) indicating that reservation is not necessary is stored as the remaining reservation number (S302). In the case where the information indicating that reservation is not necessary is received from the server 400 after the reservation request in the reservation request process, N/A is stored as the remaining reservation number. If it does not satisfy the condition of S302 (NO in S302), the processes after S103 are similar to those of the first illustrative embodiment.

In this illustrative embodiment, in the case where the remaining reservation number is more than 0 or in the case where N/A is stored as the remaining reservation number (YES in S302), the process proceeds to S111. That is, in the case where the reservation is not necessary, the printing starts.

After the printing of one page is completed in S112, it is determined whether N/A is stored as the remaining reservation number (S312). If N/A is stored as the remaining reservation number (YES in S312), information of reservation-free is added to the print completion notice in order to avoid countdown of the total reservation number managed by the server 400 (S313). After that, the print completion is notified to the server 400 (S113).

After S113, it is again determined whether N/A is stored as the remaining reservation number (S314). If N/A is stored as the remaining reservation number (NO in S314), 1 is subtracted from the remaining reservation number (S114). If N/A is stored as the remaining reservation number (YES in S314), since the MFP 200 does not manage the remaining reservation number, S114 is skipped. After S114, or if N/A is stored as the remaining reservation number (YES in S314), the process proceeds to S115.

[Reservation Request Process of MFP]

Figure 15:
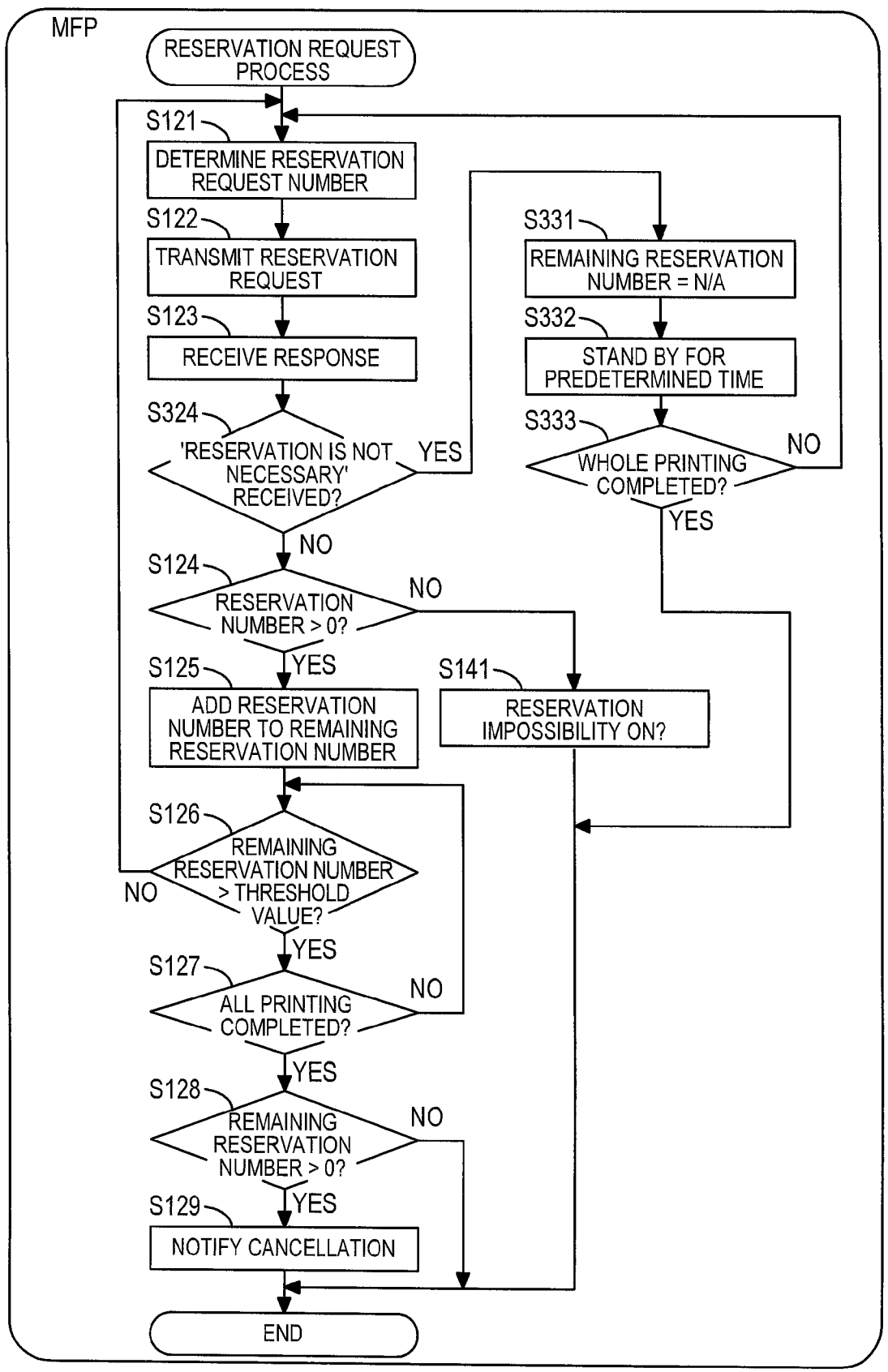
FIG. 15 is a flowchart illustrating an operation sequence of a reservation request process of the MFP according to the third illustrative embodiment.

Next, the reservation request process executed by the MFP 200 will be described with reference to the flowchart of FIG. 15. In the reservation request process of the third illustrative embodiment, MFP 200 makes the reservation request (S122), and after receiving the response (S123), it is determined whether the information indicating that reservation is not necessary is received from the server 400 (S324; an example of a unnecessity judgment unit). If the information indicating that reservation is not necessary is not received from the server 400 (NO in S324), the process proceeds to S124. The processes after S124 are similar to those of the first illustrative embodiment.

If the information indicating that reservation is not necessary is received from the server 400 (YES in S324), the code (N/A in this example) indicating that the reservation is not necessary is stored as the remaining reservation number (S331). The situation in which N/A is responded will be described later. After S331, the MFP 200 stands by for a predetermined time (S332). After standing by for a predetermined time, it is determined whether the printing of the whole pages received is completed (S333).

If all the printing is not completed (NO in S333), the process proceeds to S121, and the reservation request number C is again determined to make the reservation request. Even after it is determined that reservation is not necessary, the reservation is more likely to be necessary due to the change in situation. In order to manage the number of times further suitable for the situation, the MFP 200 stands by for a predetermined period in S332, and then again makes the reservation request. If all the printing is completed (YES in S333), the reservation request process is completed.

[Reservation Response Process of Server]

Figure 16:
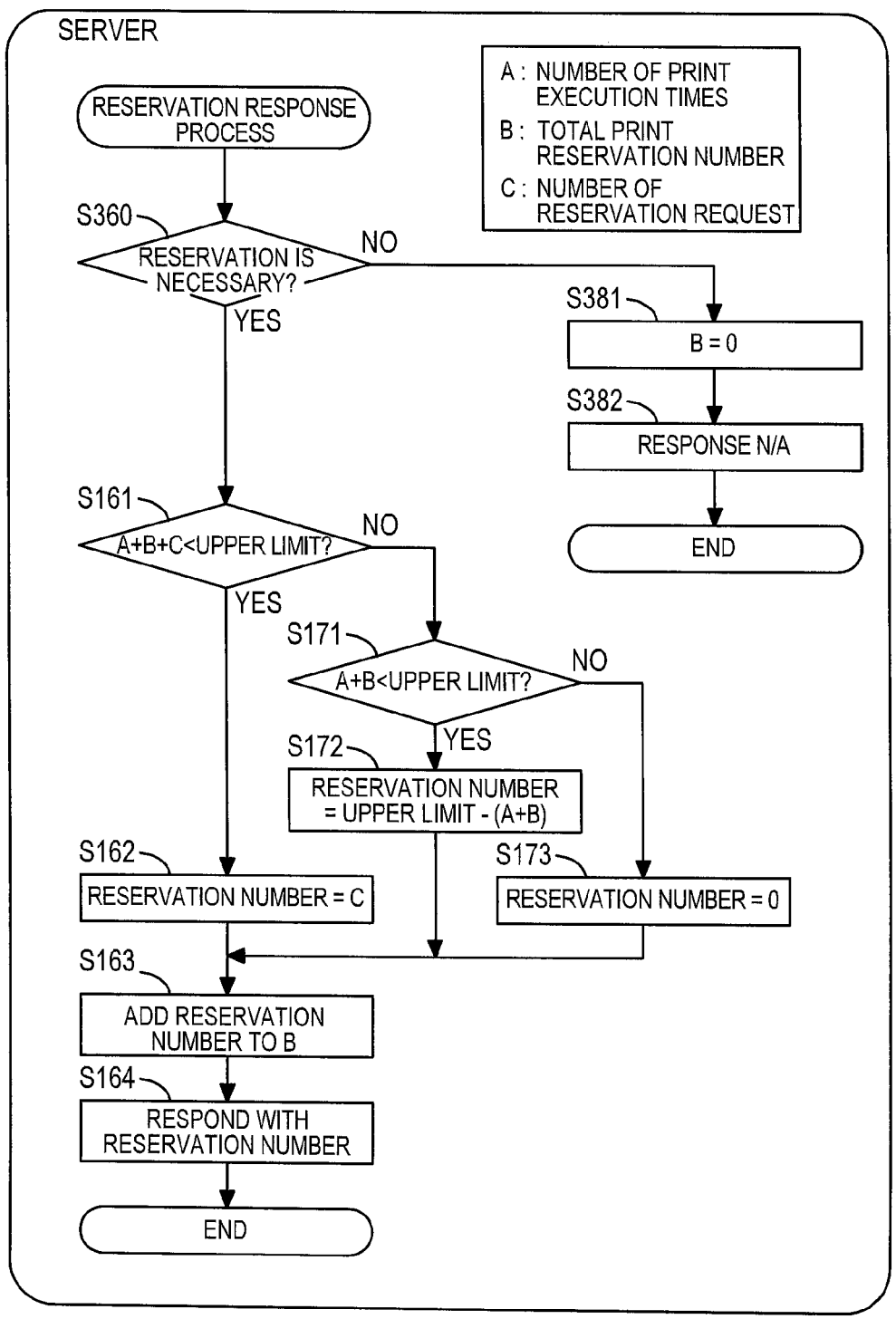
FIG. 16 is a flowchart illustrating an operation sequence of a reservation response process of the server according to the third illustrative embodiment.

Next, the reservation request process executed by the server 400 will be described with reference to the flowchart of FIG. 16. In the reservation request process of the third illustrative embodiment, it is determined whether the reservation is necessary, based on the usage situation of the printing (S360; an example of a necessity judgment unit).

In this illustrative embodiment, for example, assuming that the usage situation of the printing is an operation situation of the image forming device 10 of each MFP, it is determined that the reservation is necessary in the case where there is the MFP executing the printing, while it is determined that the reservation is not necessary in the case where the is no MFP executing the printing. That is, in the situation in which other MFP does not print, the printing executed by the MFP of the request source is unlikely to affect the printing of other MFP. The reservation process leads to increase in load since the MFP 200 and the server are communicated with each other whenever the printing is completed. For this reason, in the situation in which other MFP does not print, it is preferable to determine that the reservation is not necessary.

In addition, for example, assuming that the usage situation of the printing is a usage situation of the user of each MFP, if the same user as one of the request source is logging on or is executing the printing in an MFP other than the MFP of the request source, or is executing the printing, it is determined that the reservation is necessary. If there is no such an MFP, it is determined that the reservation is not necessary. That is, in the state in which the data such as the number of execution times is shared with other MFP, the printing executed by the MFP of the request source is more likely to affect the printing executed by other MFP. For this reason, in the state in which the same user utilizes plural MFPs, it is preferable that the reservation is necessary.

Further, for example, assuming that the usage situation of the printing is the number of remaining printing times which is made by subtracting the number of print execution times from the upper limit of the printing, if the number of remaining printing times is equal to or less than the threshold value, it is determined that the reservation is necessary. If the number of remaining printing times is more than the threshold value, it is determined that the reservation is not necessary. That is, in the state in which the number of remaining printing times is large, it is unlikely to immediately reach the upper limit of the printing, and the printing executed by the MFP of the request source is unlikely to affect the printing executed by other MFP. For this reason, in the state in which the number of remaining printing times is more than the threshold value, it is preferable that the reservation is not necessary.

If the reservation is not necessary (NO in S360), the total reservation number B for the printing is set to 0 (S381). A code (N/A in this example) indicating that the reservation is not necessary is responded to the request source of the reservation request (S382; an example of a response unit), and the reservation response process is completed. On the other hand, in the case where the reservation is necessary (YES in S360), the process proceeds to S161. The processes after S161 are similar to those of the first illustrative embodiment.

[Print Counting Process of Server]

Figure 17:
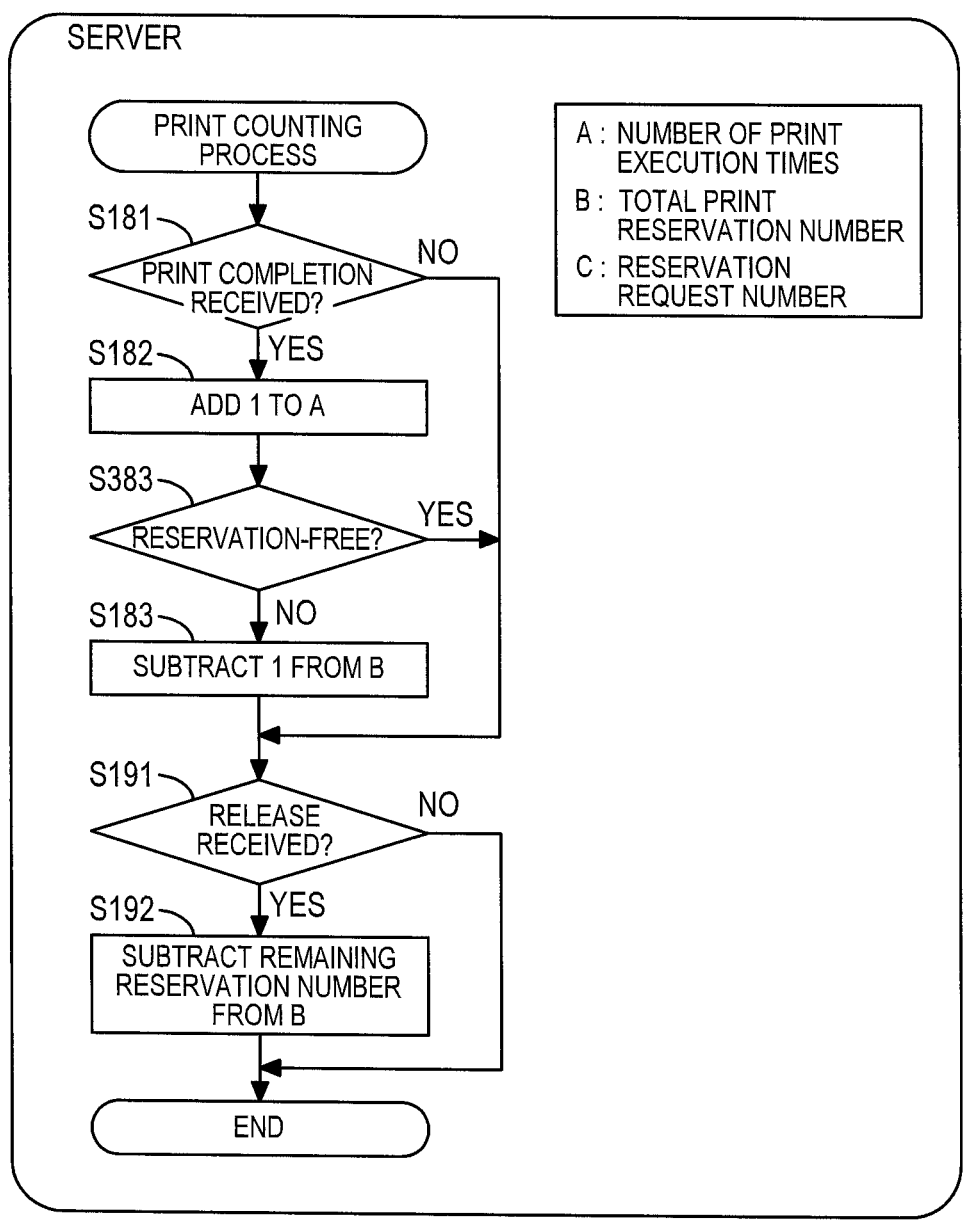
FIG. 17 is a flowchart illustrating an operation sequence of a print counting process of the server according to the third illustrative embodiment.

Next, the print counting process of the server 400 will be described with reference to the flowchart of FIG. 17. In the print counting process of the third illustrative embodiment, if the print completion notice is received (YES in S181), 1 is added to the number of print execution times (S182). Then, it is determined whether the information of reservation-free is added to the print completion notice (S383). If the reservation is not necessary, the information of reservation-free is added in S313 of the printing manage process in FIG. 14.

If the information of reservation-free is not added to the print completion notice (NO in S383), the reservation number is managed, and 1 is subtracted from the total reservation number managed by the server 400 (S183). If the information of reservation-free is added (YES in S383), since the reservation number is not managed by the MFP 200 and the server 400, S183 is skipped. Regarding the process of receiving the cancellation notice after S191, the cancellation notice is not issued from the MFP, if reservation is not necessary. For this reason, the process is only relevant to the case where the reservation is necessary. Therefore, the processes after S191 are similar to those of the first illustrative embodiment.

That is, in the technique disclosed in JP-A-2011-76235 described in the background section, the printer should acquire the permission information for the printing, and execute the process of managing the number of permitted sheets, but there are instances where a reservation is not necessary depending upon the print usage situation of the user. The management of the number of permissions (the reservation number) accompanied by the communication with server is a processing load to both the MFP 200 and the server 400.

Therefore, in the image processing system of the third illustrative embodiment, the server 400 determines the necessity of the reservation based on the usage situation of the image process, and responds to indicate that reservation is not necessary in the case where the reservation is not necessary. If the MFP 200 receives such response indicating that reservation is not necessary, the MFP starts printing without managing the remaining reservation number. Therefore, when the reservation is not necessary, it is possible to avoid the process associated with the management of the reservation number, and thus expect the reduction in processing load of each device.

In the third illustrative embodiment, although the MFP 200 determines the reservation request number C, similarly to the first illustrative embodiment, the server 400 may determine the reservation request number C, like the second illustrative embodiment. Also, in the third illustrative embodiment, although the reservation request number C requested by the MFP 200 is altered depending upon the usage situation of the printing, the reservation request number C may be a fixed value. In this instance, in S121 of the reservation request process of the MFP 200, the fixed value is acquired as the reservation request number C. Even in this case, the necessity of the reservation is determined by at least S360 of the request response process. If the reservation is not necessary, since the process associated with the management of the reservation number is avoided, it is possible to effectively manage the number of image processes.

As described in detail above, in the image processing system of the first to third illustrative embodiments, the reservation number permitted by the server 400 is set to a variable value which is determined depending upon the information of the image process. Accordingly, the image processing system can reserve the reservation number (processing amount) suitable for the condition of the image process. Therefore, the image processing system is prevented from securing the reservation number more than necessary, so that it can be expected that the execution of the image process is effectively managed.

While the present invention has been shown and described with reference to certain illustrative embodiments thereof, it will be understood by those skilled in the art that various changes in form and details may be made therein without departing from the spirit and scope of the invention as defined by the appended claims. For example, as long as the MFP has the image processing function, it may be a printer, a scanner, a copying machine, and a FAX machine.

In addition, in this illustrative embodiment, although the number of image processes is managed for each user, the object to be managed is not limited to the user. For example, the number of image processes may be managed in unit of group to which plural users belong. Also, the number of image processes may be managed for each image processing apparatus.

In this illustrative embodiment, whenever one printing is completed, the print completion is notified to the server 400. However, the notice is not limited to the transmission which is performed in unit of one print completion. For example, the notice may be transmitted in a unit of plural print completion. Also, the notice may be transmitted for one print request. In these cases, the number of printed times is added to the print completion notice, and the server 400 counts up the number of execution times corresponding to the added number of times, and counts down the total reservation number corresponding to the added number of times.

In this illustrative embodiment, although the threshold value for the subsequent reservation request of S126 in the reservation request process of the MFP 200 is the fixed value, the present invention is not limited thereto. That is, in S121, the threshold value of S126 may be changed based on the execution information of the image process (an example of a change unit), similar to the determination of the reservation request number C. For example, in the case where the print speed is faster than a predetermined speed, the threshold value of S126 is set to be larger, and thus the reservation request is made early, so that it is rare to wait for the acquisition of the reservation number. It can be expected to further effectively manage the number of image processing times by setting the threshold value of S126 as a variable value.

Specifically, the threshold value of S126 may be obtained by the following Equation 3 below:

$$\text{Threshold value} = \text{print speed (ppm)} \times \text{constant value} \quad \text{<Equation 3>}$$

For example, if the constant value is 0.1, the threshold value is 10 (=100×0.1) for the MFP having the print speed of 100 ppm. In the case where the remaining reservation number is equal to or less than 10 pages, the reservation request is transmitted. Also, the threshold value is 3 (=30×0.1) for the MFP having the print speed of 30 ppm. In the case where the remaining reservation number is equal to or less than 3 pages, the reservation request is transmitted.

In addition, in this illustrative embodiment, although the number of execution times for the image process is managed, the management unit is not limited to the number of execution times. That is, if the processing amount of the image process should be managed, for example, a usage amount of the consumable material, such as a sheet or a colorant, may be used in a management unit. In this instance, for example, in the first illustrative embodiment, the MFP 200 may request the usage amount of the consumable material in advance to the server 400 as a reservation usage amount, and determine the reservation usage amount based on the execution information of the printing. Further, for example, in the second illustrative embodiment, the server 400 may set the usage amount of consumable material, which are permitted for each request from the MFP 200, as the reservation permission amount, and determine the reservation permission amount based on the usage information of the printing.

In the first illustrative embodiment, as the data communication speed is slower, the reservation request number C is determined to be a smaller value. However, as the data communication speed is slower, the reservation request number C may be determined to be a larger value. That is, in the case where the data communication speed is slow, a problem may be in a communication line. In this instance, as the communication speed is slow, the single reservation request number C can be increased, thereby reducing the number of communications with the server 400 while securing the continuity of the consecutive process. Similarly, in the second illustrative embodiment, as the number of printers simultaneously printing is larger, the reservation permission number C0 is determined to be a smaller value. However, as the number of printers simultaneously printing is larger, the reservation permission number C0 may be determined to be a larger value. In the case where the number of printers simultaneously printing is larger, since a communication traffic volume is increased in the server 400, it will be considered that the server is overloaded. In this instance, as the number of printing simultaneously printing, the single reservation request number C can be increased, thereby reducing the number of communications with the server 400 while securing the continuity of the consecutive process.

Further, the processes described in the illustrative embodiments may be executed by a single CPU, plural CPUs, hardware of ASIC or the like, or a combination thereof. Also, the process described in the illustrative embodiment may be realized by several aspects such as a recording medium stored with a program to execute the process, or a method.

What is claimed is:

1. An image processing apparatus comprising:
   a communication unit configured to communicate with at least a server which is configured to store an upper limit for a processing amount of an image process and is configured to manage a processing amount of an image process so as not to exceed the upper limit;
   an image processing device configured to execute an image process; and
   a controller configured to perform a request process comprising:
      determining a reservation request amount which is a processing amount of the image process to be requested to the server, based on execution information of the image process;
      transmitting a permission request for a processing amount corresponding to the determined reservation request amount to the server via the communication unit, before the image process is executed by the image processing device; and
      receiving a reservation amount which is a processing amount permitted by the server or unnecessity information indicating that reservation is not necessary, the reservation amount being permitted so as not to exceed the upper limit of the processing amount in response to the permission request from the image processing apparatus,
      when the reservation amount is received, the controller is configured to control the image processing device to execute the image process within the received reservation amount; and
      when the unnecessity information is received, the controller is configured to control the image processing device to execute image process without a permission for a predetermined time period,
      when the predetermined time period elapses, the controller is configured to determine whether a job by the image processing device is completed; and
      when the job is determined to not be completed, the controller is configured to perform the request process.

2. The image processing apparatus according to claim 1, wherein the controller is further configured to, when the image processing device executes the image process after receiving the reservation amount,
   reduce a processing amount of the image process executed by the image processing device from the received reservation amount to obtain a remaining value of the reservation amount; and
   stop the image process by the image processing device when the remaining value of the reservation amount becomes zero.

3. The image processing apparatus according to claim 1, wherein the execution information includes at least one of information of an image processing speed of the image processing apparatus, information of a data communication speed of receiving image data via the communication unit, information of a job type, and information of a remaining amount of consumable material set in the image processing apparatus.

4. The image processing apparatus according to claim 3,
wherein the execution information includes information of an image processing speed of the image processing apparatus, and
wherein the controller is configured to determine the reservation request amount to be smaller as the image processing speed of the image processing apparatus is slower.

5. An image processing system including an image processing apparatus which includes an image processing device configured to execute an image process; and a server which is configured to communicate with the image processing apparatus, the server is configured to store an upper limit for a processing amount of an image process, and to manage a processing amount of an image process so as not to exceed the upper limit, the image processing system comprising:
 a processor; and
 memory storing computer-readable instructions, when executed by the processor, causing the image processing system to perform a request process comprising:
 determining a reservation request amount which is a processing amount of an image process to be requested to the server, based on execution information of the image process, the execution information including information of an image processing speed of the image processing apparatus;
 transmitting a permission request for a processing amount corresponding to the determined reservation request amount to the server, before executing the image process; and
 receiving a reservation amount which is a processing amount permitted by the server or unnecessity information indicating that reservation is not necessary, wherein the server is configured to permit the reservation amount so as not to exceed the upper limit of the processing amount in response to the permission request from the image processing apparatus;
 when the reservation amount is received, the image processing system executes the image process within the received reservation amount; and
 when the unnecessity information is received, the image processing system executes image process without a permission for a predetermined time period,
 when the predetermined time period elapses, the image processing system determines whether a job by the image processing device is completed; and
 when the job is determined to not be completed, the image processing system performs the request process.

6. An image processing system comprising:
an image processing apparatus; and
a server which is configured to communicate with the image processing apparatus,
wherein the image processing apparatus comprises:
 an image processing device configured to execute an image process;
 a first communication unit; and
 a first controller configured to perform a request process comprising:
  determining a reservation request amount which is a processing amount of the image process where the reservation request amount becomes larger as image processing capability of the image processing device is larger;
  receiving a print instruction; and
  transmitting user information of the print instruction and the determined reservation request amount to the server via the first communication unit,
wherein the server comprises:
 a second communication unit;
 a storage device configured to store an upper limit for a processing amount of an image process by the image processing device for each user information of a plurality of user information;
 a second controller configured to:
  receive the user information and the reservation request amount transmitted from the image processing apparatus via the second communication unit;
  determine if a reservation for executing the image process is necessary;
  transmit, via the second communication unit, to the image processing apparatus, the reservation request amount received as a reservation amount permitted when it is determined that the reservation is necessary and, when the received reservation request amount does not exceed the upper limit stored in the storage device for the received user information; and
  transmit, via the second communication unit, to the image processing apparatus, an amount, which is within the upper limit and within the reservation request amount received, as the reservation amount permitted when it is determined that the reservation is necessary and, when the received reservation request amount exceeds the upper limit stored in the storage device for the received user information,
  transmit, via the second communication unit, unnecessity information indicating that a reservation is not necessary, when it is determined that the reservation is not necessary;
wherein the request process further comprises
receiving the reservation amount or the unnecessity information via the first communication unit from the server;
wherein the first controller is further configured to instruct the image processing device to execute the image process within the received reservation amount when the reservation amount is received,
wherein the first controller is further configured to instruct the image processing device to execute the image process without a permission for a predetermined time period when the unnecessity information is received,
when the predetermined time period elapses, the first controller is configured to determine whether a job by the image processing device is completed; and
when the job is determined to not be completed, the first controller is configured to perform the request process.

* * * * *